(12) United States Patent
Stoddard

(10) Patent No.: US 9,551,777 B2
(45) Date of Patent: Jan. 24, 2017

(54) DIRECTION FINDING USING ANTENNA ARRAY ROTATION

(71) Applicant: Robert Eugene Stoddard, Sunnyvale, CA (US)

(72) Inventor: Robert Eugene Stoddard, Sunnyvale, CA (US)

(*) Notice: Subject to any disclaimer, the term of this patent is extended or adjusted under 35 U.S.C. 154(b) by 893 days.

(21) Appl. No.: 13/707,279

(22) Filed: Dec. 6, 2012

(65) Prior Publication Data

US 2014/0159954 A1    Jun. 12, 2014

(51) Int. Cl.
| G01S 3/38 | (2006.01) |
| G01S 3/02 | (2006.01) |
| G01S 3/30 | (2006.01) |
| G01S 3/18 | (2006.01) |

(52) U.S. Cl.
CPC .............. *G01S 3/38* (2013.01); *G01S 3/023* (2013.01); *G01S 3/18* (2013.01); *G01S 3/30* (2013.01)

(58) Field of Classification Search
CPC ............ G01S 3/44; G01S 3/30; G01S 3/18; G01S 3/38; G01S 3/16; G01S 3/28; G01S 3/023; H01Q 3/242; H01Q 3/02–3/06
See application file for complete search history.

(56) References Cited

U.S. PATENT DOCUMENTS

| 4,334,225 A * | 6/1982 | Bredow ................. H01Q 21/29 342/379 |
| 5,075,696 A * | 12/1991 | Wilby ....................... G01S 3/28 342/432 |
| 5,146,230 A * | 9/1992 | Hules ..................... H01Q 21/29 342/372 |
| 6,023,240 A * | 2/2000 | Sutton .................... G01S 5/0247 342/357.37 |
| 7,042,394 B2 * | 5/2006 | Sayers ...................... G01S 3/18 342/432 |
| 7,313,403 B2 * | 12/2007 | Gong ........................ G01S 3/28 455/404.2 |
| 2010/0079347 A1 * | 4/2010 | Hayes .................... H01Q 1/246 343/705 |
| 2011/0199263 A1 * | 8/2011 | Kang ........................ G01S 3/48 342/442 |

FOREIGN PATENT DOCUMENTS

GB          2243041 A * 10/1991 ............... G01S 3/30

* cited by examiner

*Primary Examiner* — Cassie Galt
(74) *Attorney, Agent, or Firm* — David E. Lovejoy

(57) ABSTRACT

A direction finding system for finding the angle of arrival of a target signal from a transmitter. The system includes a plurality of directional antennas positioned to face different directions for receiving the target signal. The antennas are mounted as an antenna array on a rotatable mount for supporting and rotating the antenna array. A receiver unit down converts the RF target signal to IF signals that are digitized by an A/D converter providing digital values. A computer computes the power in the signals from the A/D samples. A computer stores calibration information for the directional antennas, processes the digital values and the calibration information to determine a rotation angle $\alpha$ for rotating the antennas to provide new digital values, processes the new digital values and the calibration information to determine an intersection angle, and subtracts the rotation angle from the intersection angle to determine the final value for the angle of arrival of the target signal.

13 Claims, 9 Drawing Sheets

Physical Signal Path

Computer Signal Processing Path - FFT

FIG. 5 RF Signal Environment Spectrum, Input to Receiver
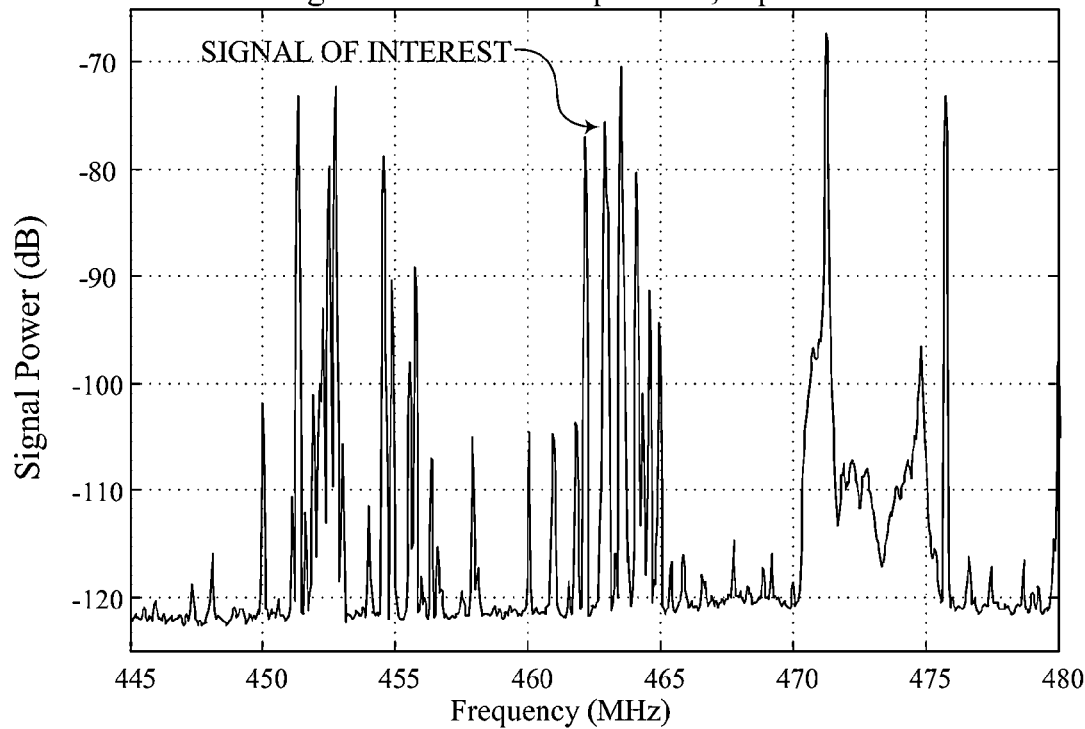
FIG. 6 Output of Receiver at 10.7 MHz IF
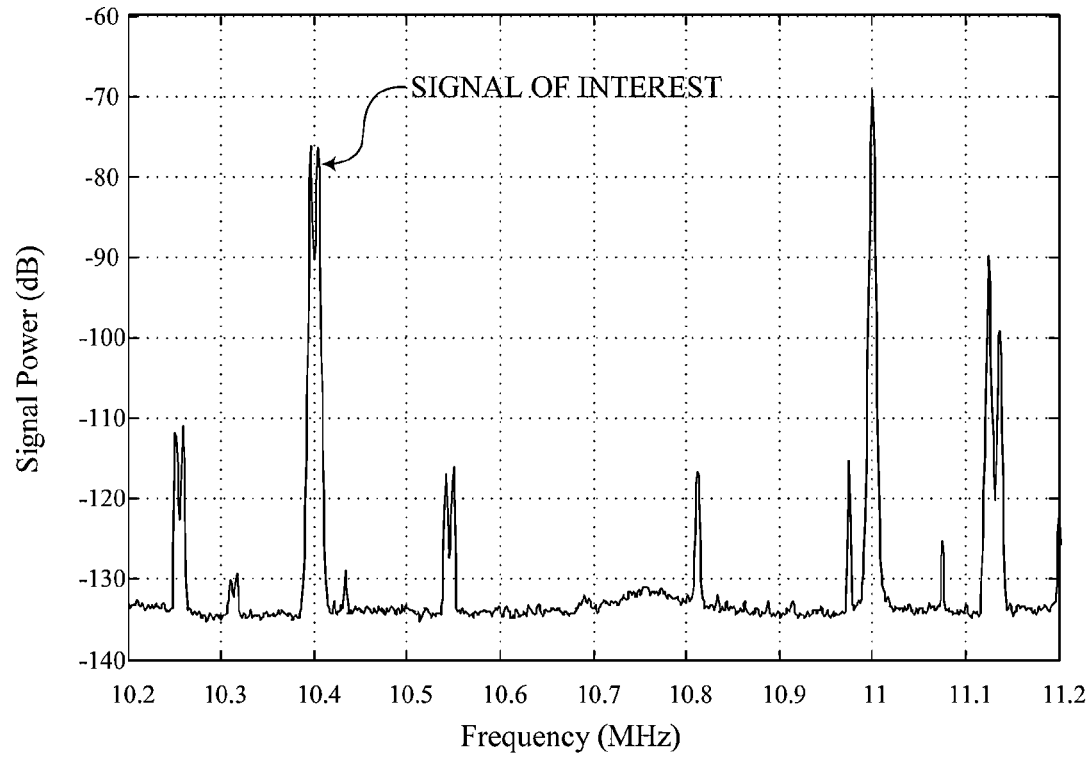

Spectrum of Signal Isolated by Filtering or FFT

US 9,551,777 B2

DIRECTION FINDING USING ANTENNA ARRAY ROTATION

BACKGROUND OF THE INVENTION

This invention relates to direction finding (DF) systems and more particularly to systems for finding the angle of arrival of radio frequency signals received from a transmitter.

DF systems have receiving antennas located at a DF site for receiving a target signal from a transmitter located at some bearing angle from the DF site. DF systems determine the angle of arrival (AOA) of the target signal at the DF site but typically do not determine the distance between the DF site and the transmitter.

Geolocation systems find the geolocation of a transmitter within a region. By knowing the location of the transmitter in the region, a geolocation system can determine the angle of arrival of the target signal at any receiving antenna in the region and can determine the distance between the transmitter and the receiving antenna.

Geolocation systems determine the location of a transmitter using two or more antennas at spatially separated antenna sites. Two DF systems can determine the location of a transmitter by finding the intersection of the lines from the DF system at the measured AOA's. Geolocation systems can use time difference of arrival (TDOA) of signals from the transmitter to the antennas to determine the geolocation of the transmitter. TDOA systems require three or more sites to be highly synchronized in time (to less than 10 nsec), require a broadband network to transfer signals to a central processor, produce large errors when the main signal is blocked by a building or something else and produce very large errors if the transmitter is not within the triangle defined by the three sites.

DF systems in general are simpler and less expensive than geolocation systems. DF systems are of two main types, phase-comparison and amplitude-comparison.

In phase-comparison DF systems, two or more antennas are configured so that the relative phases of the antenna outputs are unique. The angle of arrival is computed by analyzing the relative phases of the antenna outputs. Interferometer systems are examples of phase-comparison DF systems. Interferometer systems have relatively high angle of arrival (AOA) measurement accuracy (1°-3°), but their costs are high and extensive phase calibration is required. The interferometer systems must be thermally calibrated or compensated and multiple antennas are needed for each band to resolve ambiguities. For lower frequencies, the antenna arrays can get quite large.

In Watson-Watt systems, two co-located sets of antennas are oriented perpendicularly and the signals from the sets of antennas are subtracted. The bearing angle is computed by taking the arctangent of the ratio of the subtracted signals. The subtraction is done at RF and requires the phase of the two antennas, cables and subtraction circuit to be well matched. This operation inherently makes Watson-Watt systems phase sensitive. Watson-Watt systems are inexpensive and compact with medium AOA accuracy (4°-7°), however, they usually only cover up to 1 GHz.

In amplitude-comparison DF systems, two or more unique amplitude outputs are obtained from one or more directional antennas positioned at different angles. The angle of arrival is computed by analyzing the relative amplitudes of these outputs.

The antennas in DF systems are connected to one or more radio receivers. The radio receivers have various configurations including single-channel and multi-channel radio receivers. The antenna systems include, for example, configurations such as (i) a single-channel receiver connected to a single antenna, (ii) a single-channel receiver connected to multiple antennas and (iii) a multi-channel receiver connected to multiple antennas.

In one example of an amplitude-comparison DF system, a single antenna for receiving the transmitter signal is attached to a rotating pedestal and is connected to a single-channel receiver. The angle of arrival of the transmitter signal is determined as the pedestal angle where the received signal is strongest.

In another example of an amplitude-comparison DF system, a multi-antenna array is connected to one or more receivers for receiving the transmitter signal. The power levels of the signals received by the different directional antennas are used to determine the angle of arrival of the transmitter signal. With well selected antennas, the power levels of the received signals at the strongest two adjacent antennas in a multi-array of antennas are unique for determining the angle of arrival of the signal.

The multi-antenna array systems using amplitude comparison of the power level have the following advantages over other DF systems: no phase calibration/stability requirements; no precise timing requirements; inexpensive; one set of antennas can cover a wide frequency range; simple power calibration; the package containing the system can be light weight and compact; insensitivity to aging and thermal issues since these effects tend to be common mode to all antennas and hence are cancelled in the ΔPower calculations.

The multi-antenna array systems using amplitude comparison of the power values have the disadvantages of low accuracy and high sensitivity to RF local field amplitude variations caused by multipath and other problems.

Some direction finding systems are mobile and are located on vehicles. As the vehicles move, the systems calculate the angle of arrival of received signals. To do so, the angle of arrival outlier measurements are discarded and the rest of the measurements are processed to calculate a weighted mean angle of arrival. Some direction finding systems are stationary and operate to determine the angle of arrival of a stationary transmitter.

While many amplitude-comparison DF systems have been employed, the systems suffer from poor accuracy or high sensitivity to multipath interference and non-ideal antenna and system characteristics. Many of these problems cannot be corrected by calibration. While such amplitude-comparison DF systems are inexpensive, compact and relatively free from thermal and phase problems, they generally have low AOA accuracy (10°-15°) where higher AOA accuracy of from 1°-3° is needed.

In consideration of the above background, there is a need for improved multi-antenna array amplitude-comparison DF systems with higher accuracy and with reduced sensitivity to problems which cannot be corrected with calibration.

SUMMARY

The present invention is a direction finding system for finding the angle of arrival of a target signal from a transmitter. The system includes a plurality of directional antennas positioned to face different directions for receiving the target signal. The antennas are mounted as an antenna array on a rotatable mount for supporting and rotating the antenna array. A receiver unit connects to the directional antennas and down converts the radio frequency signals to intermediate frequency (IF) signals that are digitized by an A/D converter providing digital values representing the target signal. A computer computes the power in the signals of interest from the A/D samples. A computer stores calibration information for the directional antennas, processes the digital values and the calibration information to determine a rotation angle α for rotating the antennas to provide new digital values, processes the new digital values and the calibration information to determine an intersection angle, and subtracts the rotation angle from the intersection angle to determine the final value for the angle of arrival of the target signal.

The direction finding system uses calibration information which is ΔPowerCal values determined for a pair of adjacent antennas and the measured digital values are processed to form ΔPower values for the pair of adjacent antennas.

The direction finding system determines the rotation angle α as an angle where the ΔPowerCal values are free of ambiguities and exhibit a long, steep and smooth slope.

In one embodiment of the direction finding system, the computer executes the processing steps of determining if an ambiguity exists in the digital power value and upon detecting the ambiguity commands the rotatable mount to rotate an increment angle. The computer repeats the determining step for one or more increment angles until the ΔPowerCal values are in a region free of ambiguities.

In one embodiment of the direction finding system, the receiver unit includes one or more receivers that connect to the directional antennas through a switch. The switch connects different ones of the directional antennas to the receiver at different times whereby the receiver processes the outputs from the connected ones of the directional antennas.

The direction finding system includes an antenna array unit supporting the plurality of directional antennas positioned to face different directions for receiving the target signal, includes a rotatable mount for supporting and rotating the antenna array unit, includes a receiver unit having one or more receivers for down converting the radio frequency signal to an intermediate frequency (IF) that is digitized by the A/D converter. A computer computes the power in the signal of interest form the digital power values from the A/D samples. A computer stores calibration information for the directional antennas as a function of angular direction and provides ΔPowerCal calibration data values for a pair of the antennas. The computer provides ΔPower measured data values for the received signals from the pair of antennas for the target signal, compares the ΔPower measured data values with the ΔPowerCal calibration data values to determine a rotation angle for rotating the antenna array unit, provides new ΔPower measured data values for the received data values from the pair of antennas for the target signal at the rotation angle location, interpolates the ΔPowerCal values to determine the intersection angle where the new ΔPower data values intersect the ΔPowerCal calibration data values and subtracts the rotation angle from the intersection angle to determine the final value for the angle of arrival of the target signal.

The foregoing and other objects, features and advantages of the invention will be apparent from the following detailed description made in conjunction with the drawings.

BRIEF DESCRIPTION OF THE DRAWINGS

FIG. 5 depicts a representation of the RF signal spectrum input to the receiver from the antenna.

FIG. 6 depicts a representation of the IF signal spectrum output from the receiver.

DETAILED DESCRIPTION

Figure 1:
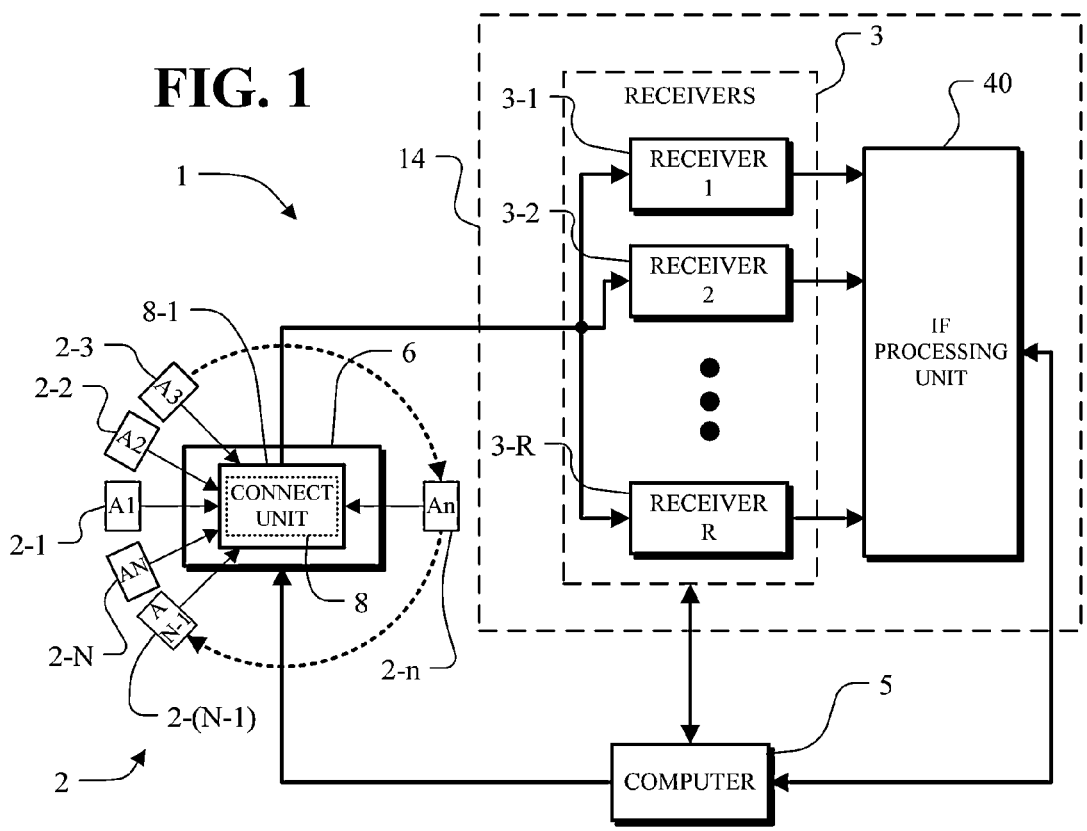
FIG. 1 depicts a block diagram representation of an N-antenna array with an N-channel radio receiver system for angle of arrival (AOA) direction finding.

In FIG. 1, a block diagram representation of a direction finding system 1 is shown including a multi-antenna array unit 2, a radio receiver unit 14 and a computer 5. The direction finding system 1 operates to detect the angle of arrival (AOA) of received radio frequency (RF) signals called "target signals" from a transmitter with an unknown bearing. In the embodiment of FIG. 1, the antenna array unit 2 includes N directional antennas 2-1, 2-2, . . . , 2-n, . . . , 2-N−1), 2-N. In typical embodiments, the number N can be any integer value equal to two or more. In one embodiment, the antennas are broadband spiral antennas. Broadband spiral antennas are selected because they a) work well with horizontal and vertical polarization, b) have roughly constant antenna beam width over a wide range of frequencies, c) are small, flat and light weight and d) have good antenna gain (~6 dB). To cover a wider range of frequencies, multiple sets of antennas can be used. For example, 8 inch diameter antennas are used to cover 0.5-6 GHz and 2 inch spirals are used to cover 4-18 GHz. Spiral antennas that cover lower frequencies get large as the wavelength gets larger. To go down to 150 MHz, the selected spirals are about 30 inches in diameter making the array diameter about 55 inches.

The antenna array unit 2 includes a rotatable table 6 which enables the azimuth angle of the antennas 2-1, 2-2, . . . , 2-N to be selected for each target signal. The multi-antenna array unit 2 connects to a radio receiver unit 14. The radio receiver unit 14 includes one or more receivers 3 including the receivers 3-1, 3-2, . . . , 3-R where R is any integer equal to or less than N. The R receivers receive N signals from N antennas. When R is equal to N, there is a receiver for each antenna. When R is less than N, two or more antennas share the same receiver. When R is equal to one, all antennas share the same receiver.

The connect unit 8-1 in the antenna array unit 2 selects the particular one or ones of the antennas to be connected to the receiver unit 14 at any particular time. If the number of antennas equals the number of receivers, that is R equals N, then connector unit 8-1 is an N-channel cable. If the number of antennas is less than the number of receivers, that is R less than N, then connect unit 8-1 includes a switch for switching receivers among antennas.

The received target signals down converted by the receiver 3 are processed in the IF processing unit 40. The IF processing unit 40 has both analog and digital embodiments. In analog embodiments, processing unit 40 includes, for example, analog filters and analog power meters for determining power values of the IF signals which are input to computer 5. In digital embodiments, processing unit 40 includes one or more A/D converters and the converted signals are connected to the computer 5. In one embodiment, multiple A/D converters are provided, one for each of the receivers 3. In other embodiments, one or more A/D converters are shared among multiple receivers.

With received antenna signals that are fairly constant over the measurement period, a switch and single receiver will provide good AOA measurements. This measurement period usually takes 1-100 msec depending on the signal integration desired. If the received signals are short, such as radar pulses, switching between antennas is a fairly poor technique as each antenna will have different pulses. If the signal transmitter is a rotating antenna radar, AOA errors will occur. Using multiple receivers to simultaneously measure the power in the same pulse eliminates this problem.

The connector unit 8-1 in the antenna array unit 2 selects by direct connection in a cable or through a switch 8 for switching the particular one or ones of the antennas to be connected to the receiver unit 14 at any particular time. The received target signals detected by the receivers 3 are processed in the IF processing unit 40 and are connected to the computer 5. The computer 5 is typically a standard microprocessor that operates to control all of the subsystems and communicate with the user. In some embodiments, the computer 5 includes a field programmable gate array (FPGA) to perform functions, such as switch control and signal processing, that need to be done quickly. The computer 5 processes the converted signals to calculate the signal power values for angle of arrival determination. To calculate the signal power values, the computer filters off all signal energy not in the prescribed bandwidth of the signal of interest. The signal power values are the total signal power in the signal bandwidth. The filtering can be done with digital filtering or an FFT. The computer 5 also connects to rotatable table 6, the switch 8 and the receiver 3 for controlling the timing and selection of the antennas to be connected to the receiving unit 14 and for controlling the processing of data received. The receivers 3 are controlled by the computer 5 subsystems to set the center frequency, bandwidth and gain to down convert the signals of interest. When the system 1 is commanded to take a recording, it records a short burst from each of the antennas to determine the signal level. Then longer recordings are made switching through each of the antennas with the gain of the receiver set to the level to optimize the A/D input level and keep the SNR as high as possible. These recordings are used to determine the power level for the AOA algorithms. The direction finding system 1 operates to detect the angle of arrival of received radio frequency target signals using an amplitude comparison algorithm. The power levels of the target signals received by the different antennas 2-1, 2-2, . . . , 2-N are used to determine the angle of arrival. A pair of the adjacent ones of the antennas 2-1, 2-2, . . . , 2-N is selected for any particular received target signal where the pair is the two adjacent antennas with the strongest received signal levels for the target signal. If the RF power of the signal changes in the time it takes to record the signal from two adjacent signals, AOA errors will result. The switch 8 should be switched between adjacent antennas as fast as possible to minimize the change in received signal strength. In one embodiment for high speed, the switching of the switch 8 is performed in a high-speed FPGA under control of the system computer 5. The FPGA is used to do fast switching to minimize the chance that the target signal changed power between consecutive switch positions.

Figure 2:
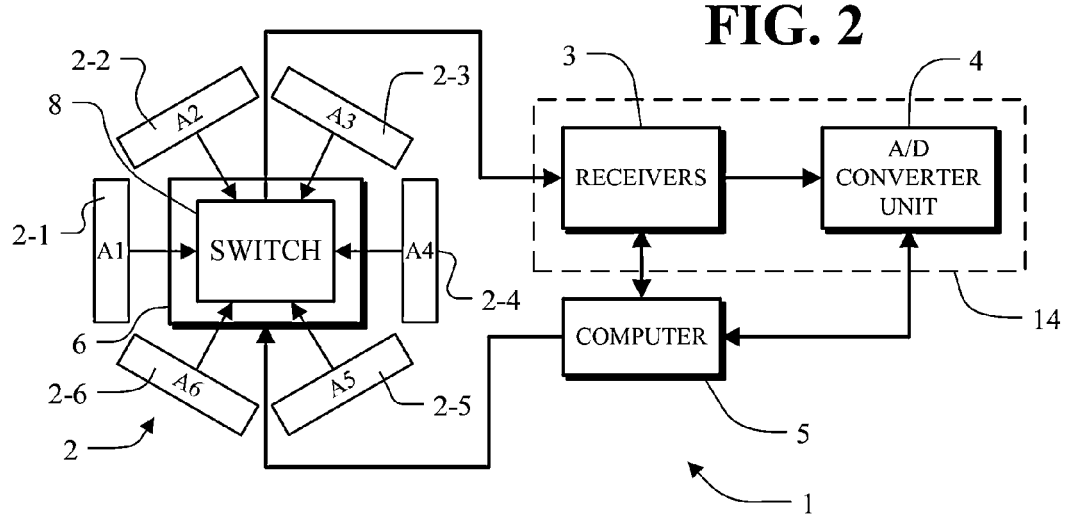
FIG. 2 depicts a block diagram representation of a 6-antenna array with a radio receiver system for angle of arrival (AOA) direction finding.

In FIG. 2, a block diagram representation of a direction finding system 1 is shown including a 6-antenna array unit 2 with a radio receiver unit 14. The direction finding system 1 operates to detect the angle of arrival (AOA) of received radio frequency (RF) signals called "target signals". In the embodiment of FIG. 2, the antenna array unit 2 includes six directional antennas 2-1, 2-2, . . . , 2-6. The antennas are typically identical but can be different. The antennas form a 6-antenna array unit where the antennas are arrayed at 60° intervals to cover a 360° angular range for receiving target signals. In a single receiver embodiment for FIG. 2, the radio receiver unit 14 includes a single receiver 3 that receives signals from the antennas 2-1, 2-2, . . . , 2-6 one at a time through operation of switch 8. The received target signals detected by the receivers 3 are A/D converted in the A/D converter unit 4 and the converted signals are connected to the computer 5. The computer 5 processes the converted signals to calculate the power in the signal of interest for angle of arrival determination.

Figure 3:
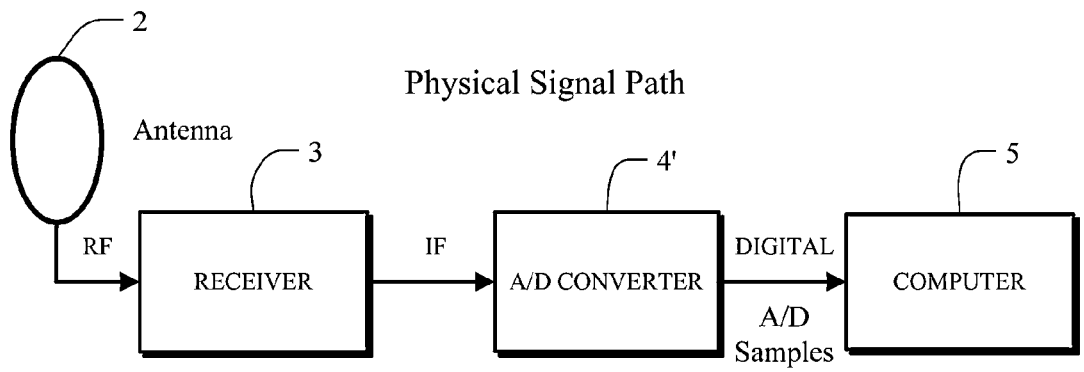
FIG. 3 depicts a block diagram representation of the physical signal path from the antenna to the computer.

In FIG. 3, the block diagram representation of the physical signal path extends from the antenna 2, through receiver 3 and A/D converter 4' to the computer 5. The signal spectrum into the receiver 3 is at RF frequencies. The signal spectrum output from the receiver and input to the A/D converter 4' is at IF frequencies. The A/D converter digitizes the IF signal producing at its output a digital-time-waveform representation of the IF signal.

Figure 4:
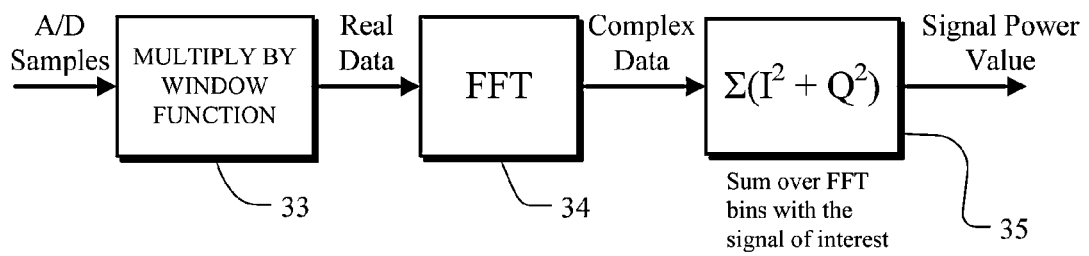
FIG. 4 depicts a block diagram representation of the computer signal processing steps.

In FIG. 4, a block diagram representation of the computer signal processing steps, for one embodiment for determining signal power values, includes a multiply-by-window function 33, an FFT function 34 and a sum function 35. The multiply-by-window function 33 processes the A/D samples to feed the FFT, the weighted output consists of real data samples. The FFT function 34 processes the real data and produces outputs in bins in the form of complex data having I and Q components. The sum function 35 forms the sum over the FFT bins containing the signal of interest. The sum is the square of the I and Q components, $\Sigma(I^2+Q^2)$, which produces the signal power for the signal of interest.

In FIG. 5, a representation of a typical RF signal spectrum input to the receiver 3 from the antenna 2 of FIG. 3 with the SIGNAL OF INTEREST designated.

In FIG. 6, a representation of the IF signal spectrum output from the receiver 3 in response to the input of FIG. 5 with the SIGNAL OF INTEREST designated.

Figure 7:
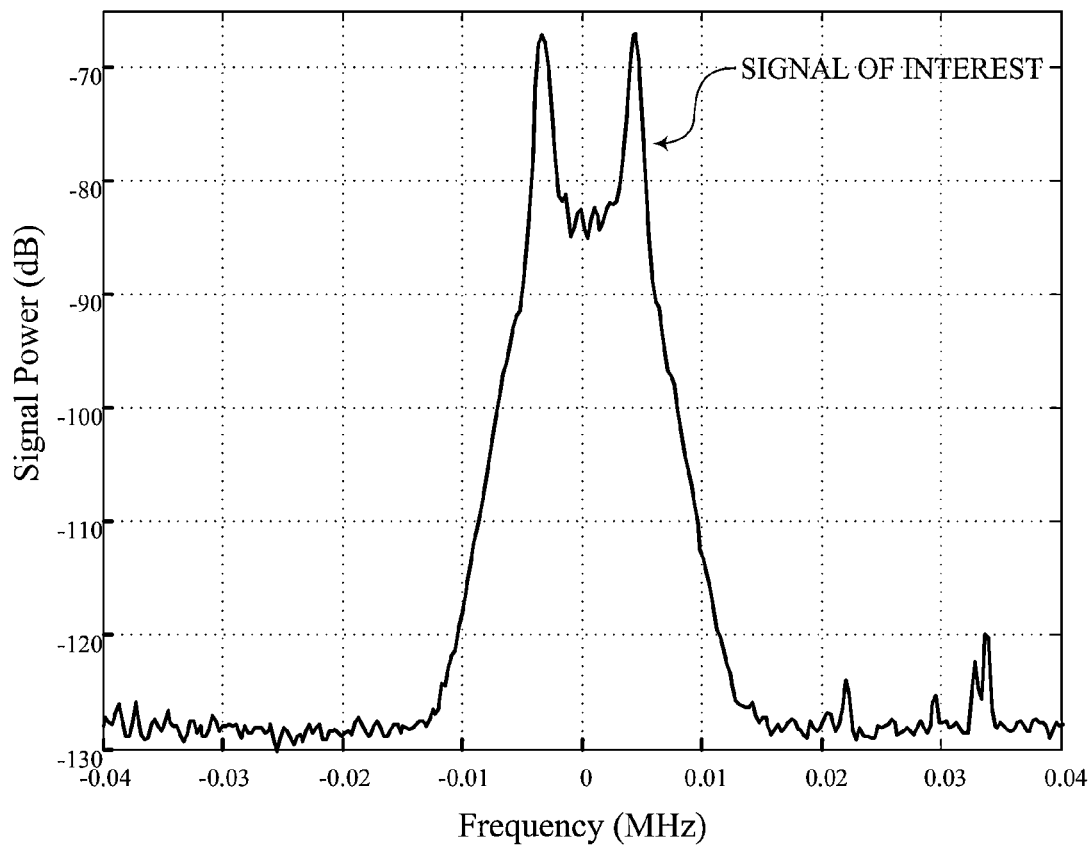
FIG. 7 depicts a representation of the signal spectrum isolated by FFT processing.

In FIG. 7, a representation is shown of the signal spectrum of the SIGNAL OF INTEREST as isolated by FFT processing.

Figure 8:
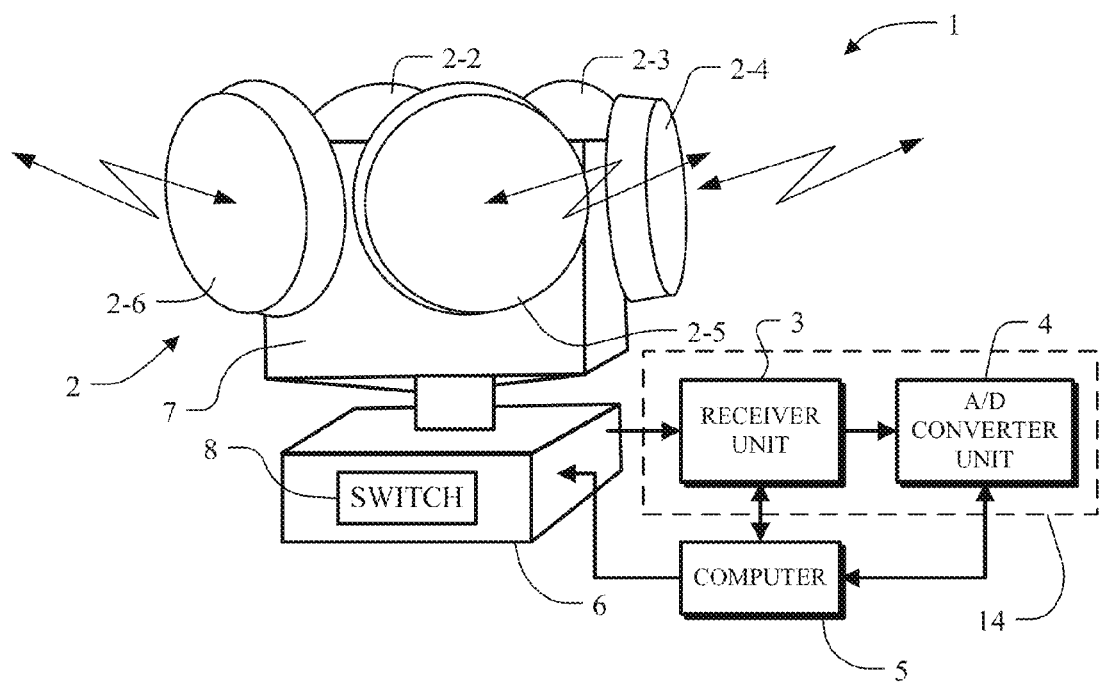
FIG. 8 depicts a block diagram representation of the FIG. 2 system with the multi-antenna array shown in a perspective view.

In FIG. 8, a block diagram representation of the FIG. 2 direction finding system 1 is shown with the multi-antenna array unit 2 shown in a perspective view. In FIG. 8, the antenna array unit 2 includes six directional antennas 2-1, 2-2, . . . , 2-6. In one embodiment, each of the antennas is an eight inch broadband spiral antenna. The switch 8 in the antenna array unit 2 selects the particular one or ones of the antennas 2-1, 2-2, . . . , 2-6 to be connected to the receiver unit 14 at any particular time. In alternate embodiments, the receiver unit 14 has two receivers (one for the two strongest antenna signals) or has six receivers (one for each of six antennas). The received signals detected by the receiver unit 14 are A/D converted in the A/D converter UNIT 4 and the converted signals are connected to the computer 5. The computer 5 processes and stores the signal power values for angle of arrival determination. The computer 5 also connects to rotatable table 6, the switch 8 and the receiver 3 for controlling the timing and selection of the antennas to be connected to the receiving unit 14 and for controlling the processing of data received.

Figure 9:
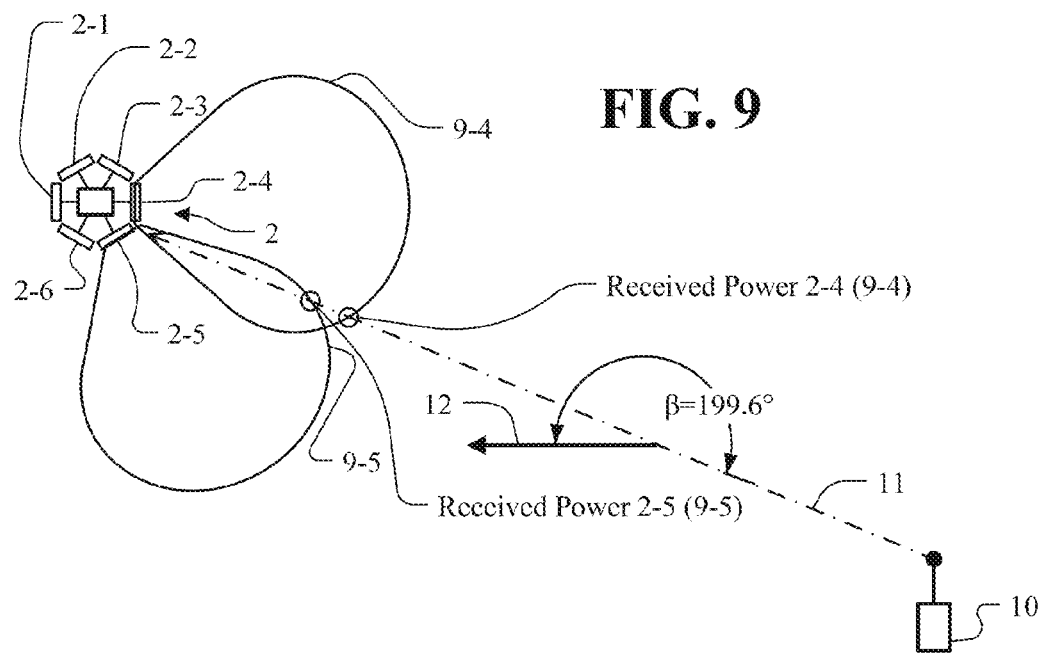
FIG. 9 depicts a schematic view of antenna patterns from a pair of antennas of the 6-antenna array of FIG. 2 and FIG. 8.

In FIG. 9, a schematic view of antenna patterns 9-4 and 9-5 from the pair of antennas 2-4 and 2-5 of the multi-antenna array unit 2 of FIG. 2 and FIG. 8 are shown. A received RF target signal 11 from a transmitter 10 is shown. The angle of arrival, β, of the RF signal 11 from transmitter 10 in the example of FIG. 9 is between 180° and 240° measured relative to the reference direction 12. Of course, the angle of arrival, β, can be any value from 0° to 360°. The pair of antennas selected from the multi-antenna array unit 2 is determined as the pair of antennas having the strongest signals. Since the antennas 2-1, 2-2, ..., 2-6 are directional, the pair of antennas 2-4 and 2-5 together are likely to have the strongest signals for a target signal having an angle of arrival between 180° and 240°. The antennas 2-4 and 2-5 are the selected pair for purposes of the FIG. 9 example with a target signal having an angle of arrival of 199.6°. If the angle of arrival were between 0° and 60°, 60° and 120°, 120° and 180°, 240° and 300°, or 300° and 360° then the selected pairs likely would be antennas 2-1 and 2-2, 2-2 and 2-3, 2-3 and 2-4, 2-5 and 2-6 and 2-6 and 2-1, respectively.

In FIG. 9, the received power level for the antenna 2-4 is designated with a solid circle at the intersection of the received signal 11 and the array pattern 9-4, "Received Power 2-4 (9-4)". The received power level for the antenna 2-5 is designated with a solid circle at the intersection of the received signal 11 and the array pattern 9-5, "Received Power 2-5 (9-5)".

Figure 10:
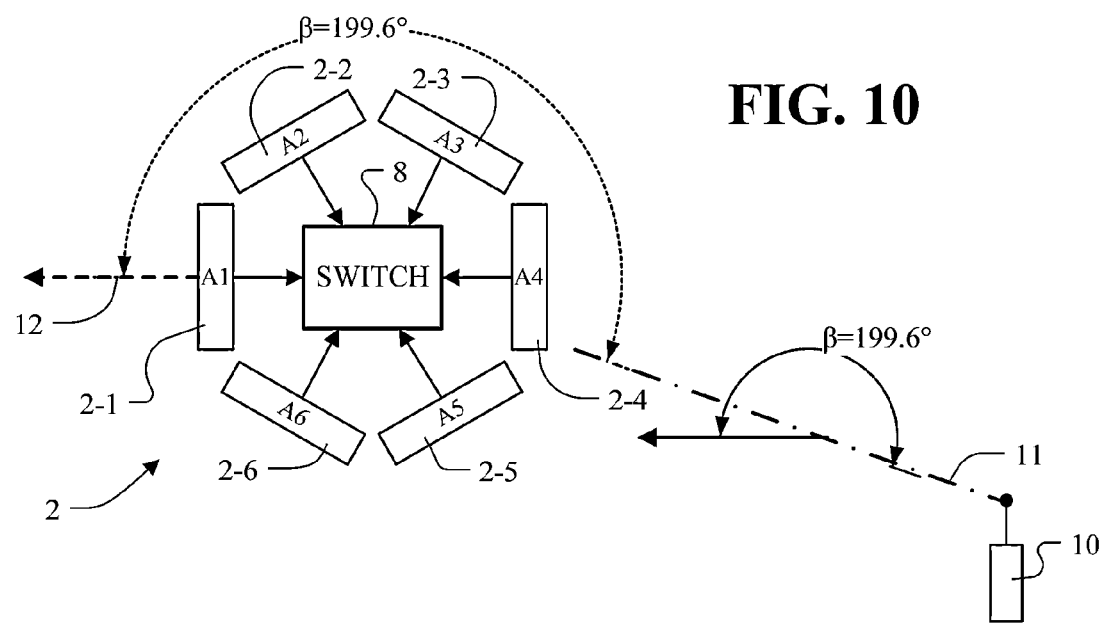
FIG. 10 depicts the 6-antenna array of FIG. 2 and FIG. 8 at a reference orientation.

In FIG. 10, the multi-antenna array unit 2 of FIG. 2 and FIG. 8 is shown at the reference orientation with the plane of the antenna A1 normal to the reference direction 12 as described in connection with FIG. 9. The antennas 2-4 and 2-5 are the selected pair of antennas for purposes of the FIG. 9 and FIG. 10 example where the angle of arrival, β, of the RF target signal 11 is between 180° and 240°. In the particular example described, β=199.6°. In FIG. 10, the selected pair of antennas 2-4 and 2-5 each detects the target signal 11 and produces target signal power values used to determine the angle of rotation required for the antenna array unit 2 in order to provide an accurate angle of arrival determination. The angel of rotation, α°, can be positive or negative, that is, +α° or −α°.

Figure 11:
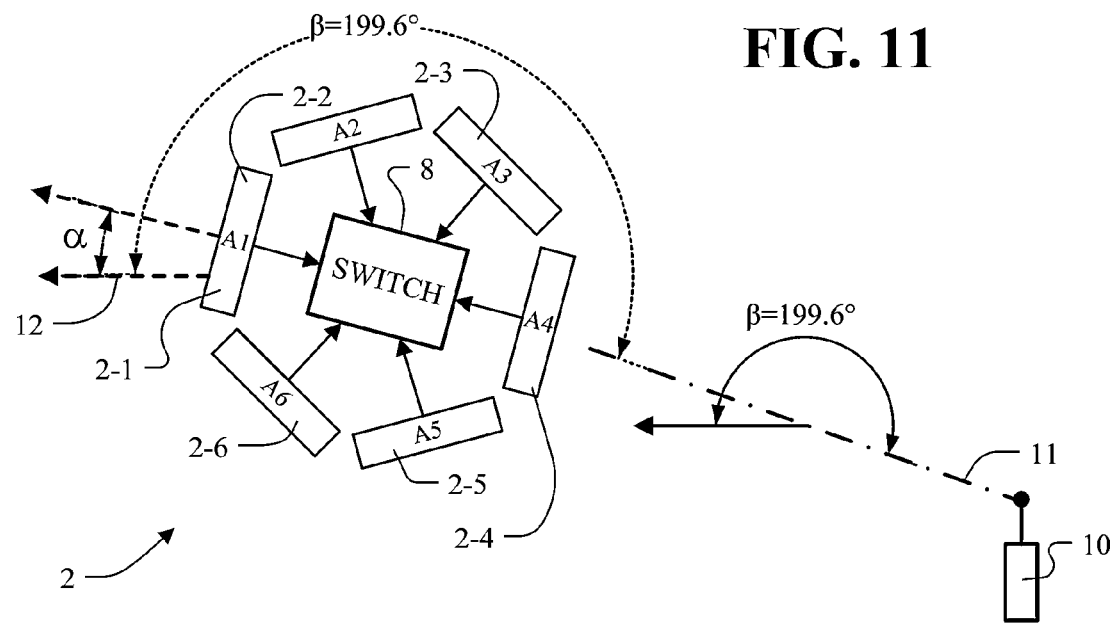
FIG. 11 depicts the 6-antenna array of FIG. 2 and FIG. 8 rotated relative to the reference orientation of FIG. 10 by the a rotation angle.

In FIG. 11, the multi-antenna array unit 2 of FIG. 2 and FIG. 8 is shown at a rotation angle orientation. The rotation angle orientation resulted by rotating the antenna array unit 2 clockwise +α° relative to the reference orientation of FIG. 10. In FIG. 11, the selected pair of antennas 2-4 and 2-5 each detects the target signal 11 and produces target signal power values used to determine the angle of rotation according to the angle of arrival algorithm processing.

The angle of arrival algorithm encompasses a number of processes. The angle of arrival algorithm requires calibration of each of the antennas in the antenna array unit 2. For each antenna array unit 2, a calibration table of received calibration power levels is formed for each antenna in response to a transmitted calibration signal. The transmitted calibration signal is transmitted to cover the full angular range from 0° to 360°. In order to cover the full angular range from 0° to 360°, each antenna is positioned relative to the direction of the calibration signal at each one of a number of calibration angles called angle calibration steps.

In one embodiment, the angle calibration steps are 2° apart so that there are 180 angle calibration steps required to cover the full 360°. The power measurements are made at each calibration step angle for each antenna and for each frequency over a frequency operation range. The frequency operation range is covered by frequency steps that typically range from 1 MHz steps to 50 MHz steps. The completed calibration table includes, for each antenna, a received calibration power level at each angle step for each frequency step.

In order to determine the angle of arrival of a target signal, the first step is to determine the power levels received in each of the N antennas (six antennas in the embodiment of FIG. 2 and FIG. 8) in response to receiving the target signal. The two adjacent antennas having the highest power levels are selected as the antenna pair for further processing and are named "Antenna 1" and "Antenna 2".

Since any particular target signal to be processed to determine its angle of arrival may have a frequency that is in between the frequency step entries in the calibration table, interpolation methods are employed to improve accuracy. The result of such interpolation is referred to as an interpolated calibration table and/or as interpolated calibration data.

The initial processing determines the approximate frequency of a received target signal, that is, determines the target signal frequency. Assuming that the target signal frequency is not precisely one of the step frequencies in the calibration table but falls between step frequencies, the calibration table is interpolated to provide interpolated calibration power levels at each of the step angles for each antenna in the antenna pair.

The interpolated calibration data for each antenna of the antenna pair has variations which may evidence, for example, ripple regions, shallow slope regions and longer and steeper smooth slope regions. The regions are observable visually when plotted in a Power versus Angle graph but the regions are intrinsically present in the data whether graphed or not.

After forming the interpolated calibration power levels for each antenna, the calibrated power difference values (ΔPowerCal) are calculated by subtracting the ANTENNA 2 power values from the ANTENNA 1 values. The ΔPowerCal values thus calculated will also typically evidence ripple regions, shallow slope regions and longer and steeper smooth slope regions that vary as a function of angle. The calibrated power difference values (ΔPowerCal) are processed to find a good region for further analysis. The good region selected is typically the longest region having a steeper smooth slope. The ends of the good region have power values that are away from the ambiguities caused by the ripples. Power buffer regions of 3-6 dB are typically used. The good region also has a frequency guard band to keep away from regions where the slope is shallow. A typical guard band is 2 MHz. These guard bands ensure that a noise or modulation on the signal does not cause enough of a power error to take the signal into ambiguous or high error angles. For the good region selected, the maximum ΔPowerCal, ΔPowerCal$_{max}$, and the minimum ΔPowerCal, ΔPowerCal$_{min}$, are determined. These calibration values ΔPowerCal$_{max}$ and ΔPowerCal$_{min}$ are used to determine an appropriate angle and direction for rotating the antenna array unit 2 for accurate angle of arrival determination.

After processing the calibration data to determine the calibration values ΔPowerCal$_{max}$ and ΔPowerCal$_{min}$ values, the measured power levels for the target signal are processed. For the target signal, the power difference values (ΔPower) are calculated by subtracting the ANTENNA 2 power values from the ANTENNA 1 values for the target signal.

A determination is made as to whether the measured ΔPower, $\Delta Power_{mea}$, for the received target signal is greater than the calibration $\Delta PowerCal_{max}$ and if greater, the antenna array unit 2 is rotated clockwise an angle +α until the measured ΔPower, $\Delta Power_{mea}$, is less than $\Delta PowerCal_{max}$. After such a +α rotation angle, the received target signal is operating in the good region.

Also, a determination is made as to whether the measured ΔPower, $\Delta Power_{mea}$, for the received target signal is less than the calibration $\Delta PowerCal_{min}$ and if less, the antenna array unit 2 is rotated counter clockwise an angle -α until the measured ΔPower, $\Delta Power_{mea}$, is greater than $\Delta PowerCal_{min}$. After such a -α rotation angle, the received target signal is operating in the good region.

After the antenna array unit 2 has been rotated by the rotation angle, +α or -α, the ΔPowerCal data is interpolated to determine the new measured angle of arrival. The new measured angle of arrival is the angle where the $\Delta Power_{mea}$ value intersects the ΔPowerCal data.

After determining the new measured angle of arrival, the rotation angle, +α or -α, is subtracted from the new measured angle of arrival to find the true angle of arrival.

Figure 12:
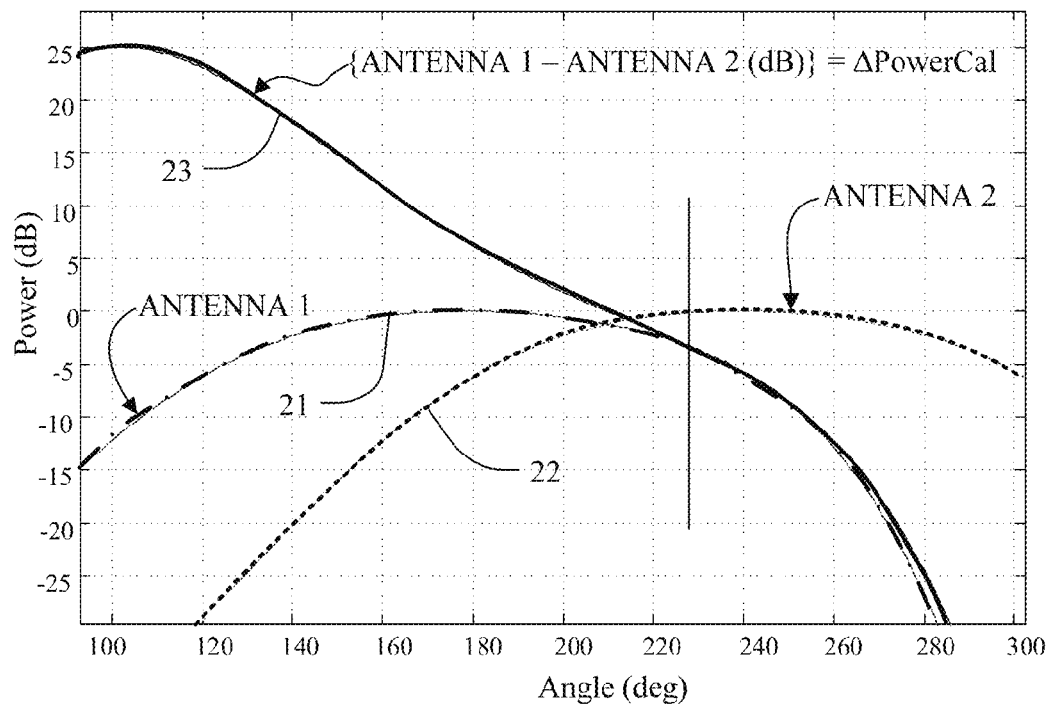
FIG. 12 depicts idealized plots having polynomial shapes of Power vs. Angle for two antennas together with a plot of the power difference between those two plots over an angular range from 100 to 300 degrees.

In FIG. 12, a plot of Power (dB) vs. Angle (deg) of Antenna 1 is designated as curve 21 and of Antenna 2 is designated as curve 22. The curves 21 and 22 have smooth polynomial shapes and are idealized representations of antenna power levels detected by Antenna 1 and Antenna 2 from a calibration signal. Antenna 1 and Antenna 2 represent, for example, antenna A4 and antenna A5, respectively, as depicted in FIG. 9. The curve 23 in FIG. 12 is a plot of the ΔPowerCal versus Angle curve formed by subtracting the data values represented by curve 22 from the data values represented by curve 21 over an angular range from about 100 to 300 degrees.

While the antenna patterns for curves 21 and 22 of FIG. 12 are smooth and monotonically decreasing from the center point, such ideal patterns are not representative of most antennas. Unfortunately, at most frequencies, the antenna patterns in an array of antennas have ripple resulting in angle of arrival ambiguities.

Figure 13:
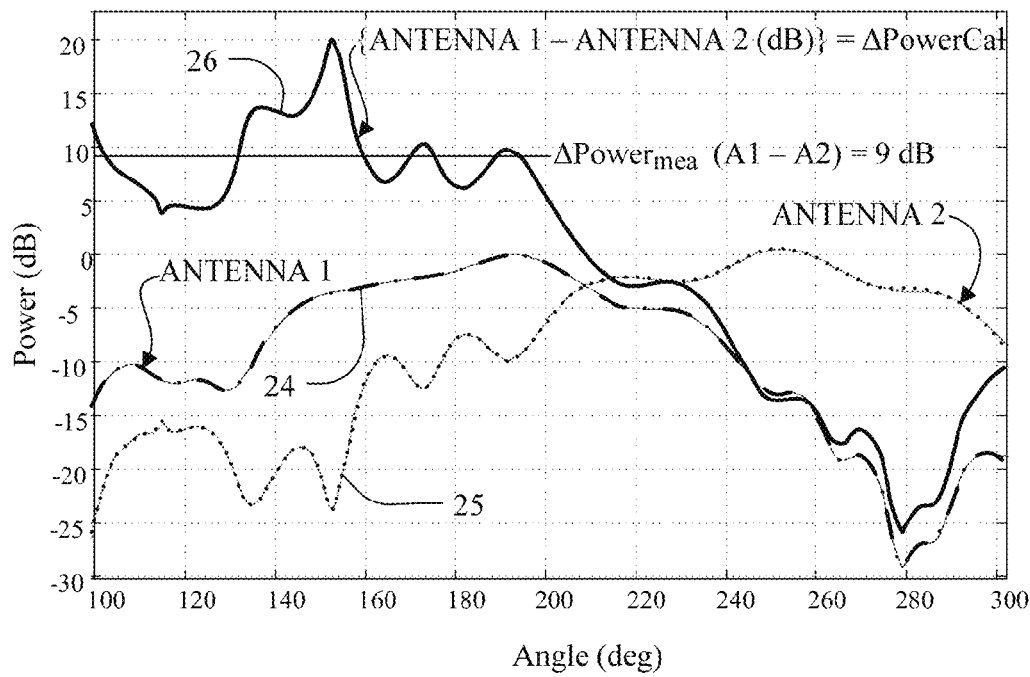
FIG. 13 depicts typically plots of Power vs. Angle of two of the adjacent antennas depicted in FIG. 9 together with a plot of the power difference between those two plots over an angular range from 100 to 300 degrees for a 2.42 GHz signal.

In FIG. 13, a plot 26 of calibration data for two antennas is shown for a 2.42 GHz signal. Antenna 1 is designated as having calibration curve 24 and Antenna 2 is designated as having calibration curve 25. Curve 26 is determined as the ΔPowerCal values by subtracting the curve 25 values from the curve 24 values over the range from about 100° to 300°. The calibration data represented by curve 26 is used for determining the angle of arrival AOA of a target signal having a 2.42 GHz frequency. By way of example, it is assumed that a target signal has measured values of power such that the difference of measured power between antenna 1 and antenna 2 is 9 dB, that is, $\Delta Power_{mea}$=9.0 dB. For $\Delta Power_{mea}$=9.0 dB, the calibration data represented by curve 26 in FIG. 13 has seven angle of arrival ambiguities as indicated by the ripple in curve 26 crossing the horizontal line designating the $\Delta Power_{mea}$=9.0 dB value seven times.

In order to remove the angle of arrival ambiguities described in connection with FIG. 13, processing of the calibration data and repositioning of the directional antennas is carried out. The antenna array unit 2 and each of the antennas 2-1, 2-2, . . . , 2-6 are calibrated and the calibration values for each antenna are stored as calibration data in a calibration table. The calibration table contains the received power over 360 degrees of azimuth for all antennas at the frequencies of interest. In one embodiment, the 360 degrees are covered using 2 degree azimuth steps. Of course, smaller or larger steps can be used for higher or lower resolution. The frequency resolution is determined by the rate of change of the pattern over frequency for the frequencies of interest. In some bands, as low as 1 MHz steps are used. In well behaved frequencies or low priority frequencies, the calibration uses 50 MHz steps, for example.

In order to remove the angle of arrival ambiguities described in connection with FIG. 13, processing of the calibration data and repositioning of the directional antennas is carried out. The antenna array unit 2 and each of the antennas 2-1, 2-2, . . . , 2-6 are calibrated and the calibration values for each antenna are stored as calibration data in a calibration table. The calibration table contains the received power over 360 degrees of azimuth for all antennas at the frequencies of interest. In one embodiment, the 360 degrees are covered using 2 degree azimuth steps. Of course, smaller or larger steps can be used for higher or lower resolution. The frequency resolution is determined by the rate of change of the pattern over frequency for the frequencies of interest. In some bands, as low as 1 MHz steps are used. In well behaved frequencies or low priority frequencies, the calibration uses 50 MHz steps, for example.

The table is compiled by putting the antenna array on a rotary stage and receiving the known signal transmitted by a local antenna. The power is measured for each antenna at each frequency and angle. The calibration can be done in an anechoic chamber, an antenna range or in the deployment site.

An example of a calibration table segment at one frequency for an array with six antennas is shown in the following TABLE 1. Similar tables are generated for all frequencies of interest.

TABLE 1

| Azimuth | Power1 | Power2 | Power3 | Power4 | Power5 | Power6 |
|---------|--------|--------|--------|--------|--------|--------|
| -180 | -63.71 | -63.75 | -60.84 | -47.61 | -57.14 | -70.32 |
| -178 | -63.39 | -62.36 | -60.70 | -47.51 | -56.29 | -68.90 |
| -176 | -63.25 | -62.08 | -61.12 | -47.72 | -55.78 | -67.40 |
| -174 | -63.20 | -62.55 | -62.08 | -47.92 | -55.29 | -65.76 |
| -172 | -63.33 | -63.92 | -63.68 | -48.13 | -54.90 | -64.39 |
| -170 | -63.74 | -66.25 | -65.89 | -48.34 | -54.60 | -63.47 |
| -168 | -64.50 | -69.34 | -68.32 | -48.56 | -54.33 | -62.96 |
| -166 | -65.77 | -72.02 | -69.82 | -48.79 | -54.01 | -62.89 |
| -164 | -67.90 | -71.88 | -69.80 | -49.04 | -53.52 | -63.43 |

Figure 14:
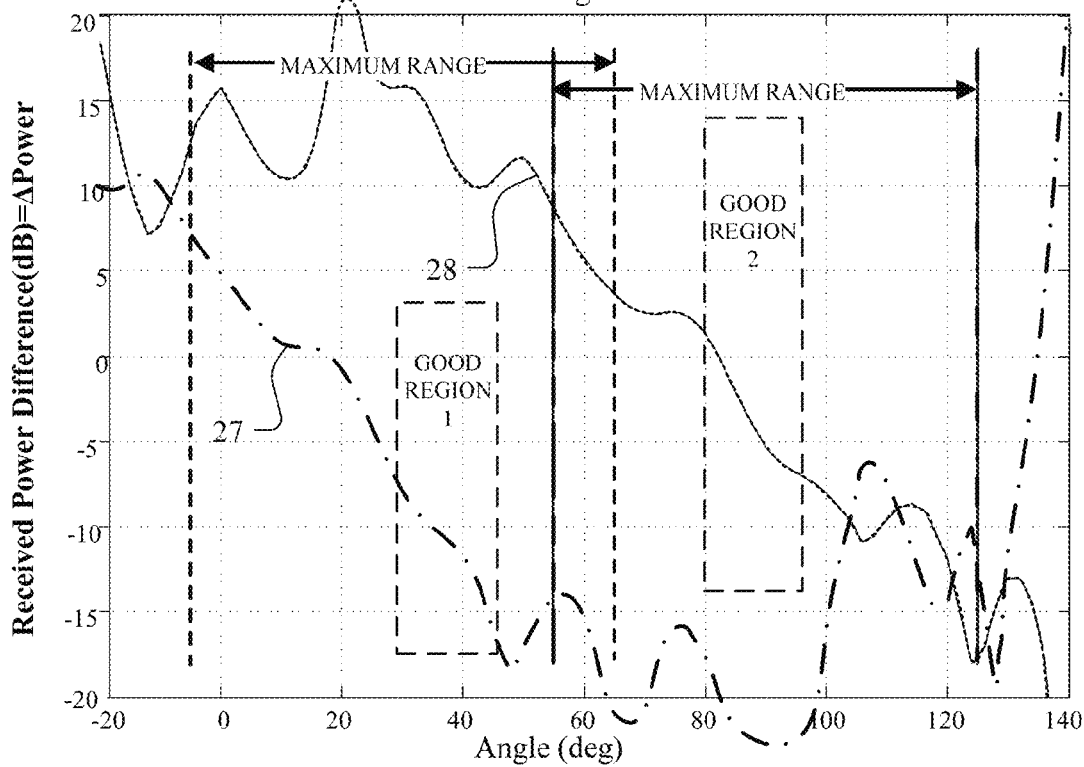
FIG. 14 depicts plots of Received Power Differences versus Angle for two pairs of antennas over an angular range from −20 to 140 degrees for a 2340 MHz signal.

In FIG. 14, plots of Received Power Differences, ΔPowerCal, versus Angle for two pairs of antennas are shown over an angular range from -20 to 140 degrees for a 2340 MHz signal. The antenna system is the antenna array unit 2 with the six antennas 2-1, 2-2, . . . , 2-6. Each adjacent pair of the antennas 2-1, 2-2, . . . , 2-6 is used to cover approximately 70 degrees. More explicitly, the antennas A1 and A2 cover -5° to 65°, the antennas A2 and A3 cover 55° to 125°, the antennas A3 and A4 cover 115° to 185°, the antennas A4 and A5 cover 175° to 245°, the antennas A5 and A6 cover 235° to 305°, and the antennas A5 and A6 cover 295° to 5°.

In FIG. 14, the curve 27 represents the ΔPowerCal difference between the A1 antenna 2-1 and the A2 antenna 2-2 values over the range from approximately -20° to 140° and the curve 28 represents the difference values between the A2 antenna 2-2 and the A3 antenna 2-3 signals over the range from approximately -20° to 140°.

With the ΔPowerCal difference calibration curves 27 and 28 of FIG. 14, the "good" angles are identified. The useful ranges which contain the "good" angles are the portions of the curves 27 and 28 that are monotonic and are away from ambiguities or shallow slope regions. These useful good ranges are shown by the rectangles formed with dashed lines in FIG. 14. More particularly, for the curve 27, one useful range, GOOD REGION 1, is from approximately 20° to 36°.

For the curve 28, one useful range, GOOD REGION 2, is from approximately 80° to 95°. If no good region is found, the system will check the calibration tables for other antenna in the array to see if rotating to different antennas will have good regions. For example, if Antenna 3 and Antenna 4 don't have a good region, perhaps Antenna 2 and Antenna 3 or Antenna 4 and Antenna 5 will have a good region. If the system does not have a good region at the given frequency, the AOA is measured and reported to the user with an indication that the measurement likely has large errors. In actual testing, 200 frequencies were checked and good regions of at least 6 degrees in width existed for every antenna pair.

Figure 15:
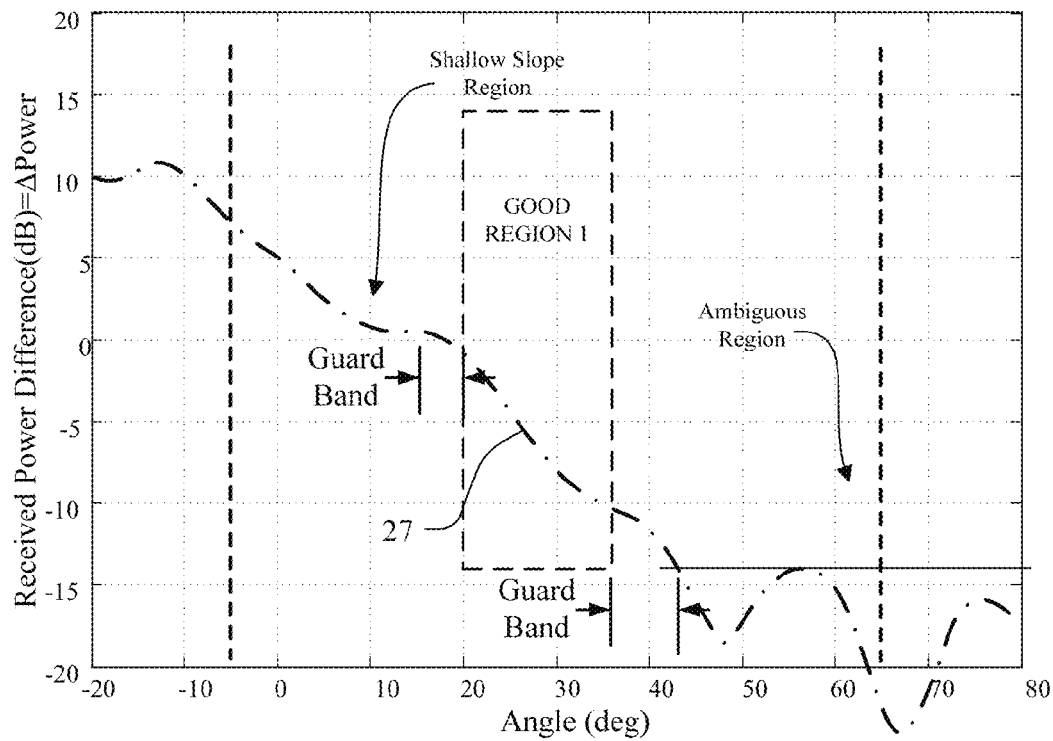
FIG. 15 depicts an expanded plot of Power vs. Angle of one of the plots depicted in FIG. 14 over an angular range from −20 to 80 degrees.

In FIG. 15, an expanded plot of Received Power Difference, ΔPowerCal, versus Angle for the difference between the A1 and A2 antenna data values is shown as represented by curve 27 in FIG. 14. The expanded angular range in FIG. 15 is from −20 to 80 degrees. In that expanded range, the GOOD REGION 1 extends from about 20° to 36°. The GOOD REGION 1 is the same as identified in FIG. 14. The GOOD REGION 1 includes regions before approximately 20° and after approximately 36° that appear noise free and hence act as guard bands around the GOOD REGION 1.

Figure 16:
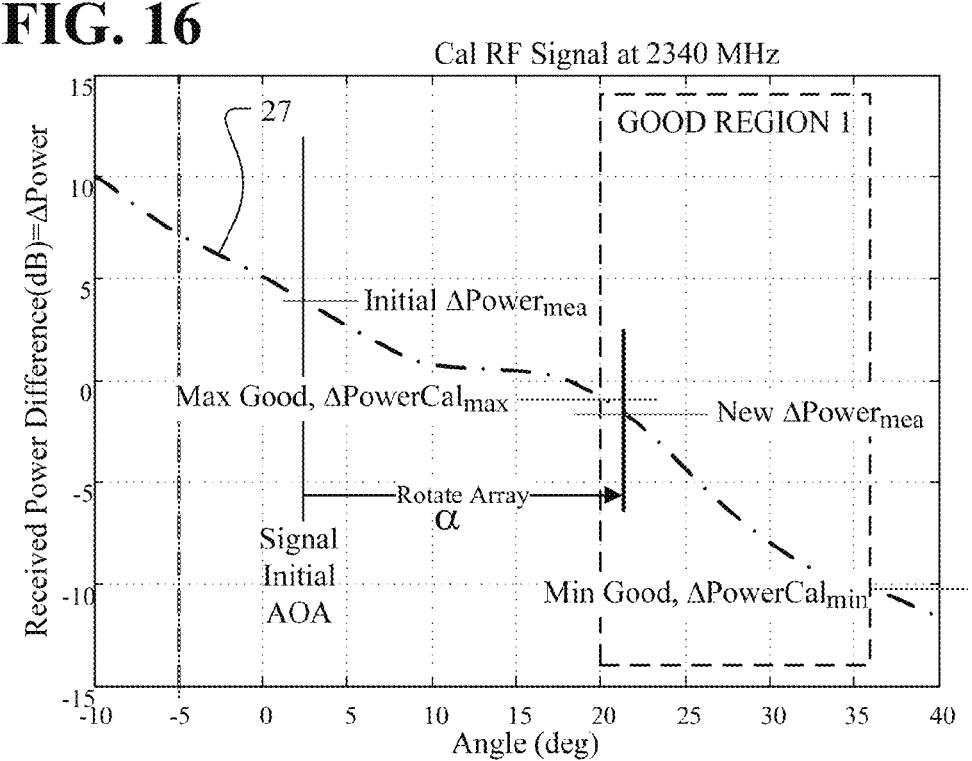
FIG. 16 depicts an expanded plot of Power vs. Angle of the plot depicted in FIG. 15 over an angular range from −10 to 40 degrees.

In FIG. 16, a plot of the calibration Received Power Difference, ΔPowerCal, versus Angle for the difference between the A1 and A2 antenna signals is shown as represented by curve 27 over an angular range from −10 to 40 degrees for a 2340 MHz signal. A test RF signal to be measured for angle of arrival is originally detected with a Received ΔPower value of approximately 4 dB indicating a new angle of arrival between 2° and 3°. Since the new angle of arrival is not within the GOOD REGION 2, the antenna unit 2 of FIG. 2 and FIG. 8 is rotated a degrees to bring the received test signal within the GOOD REGION 2. The rotation angle, α, is not known when the ΔPower is measured. Due to the ambiguities caused by the ripples shown in FIG. 12, there are multiple choices for α. The smallest ambiguous value of a is used first to rotate the antenna array. If there are no ambiguities, the calibration table is interrogated to determine the best estimate of the angle α needed to get in the good region and the array is rotated by this amount. After this rotation, ΔPower is measured again. If this is in the good region, the AOA is measured. If this is not in the good region, the search process is repeated until ΔPower is in the good region. In the FIG. 16 example, the angle of rotation, α, equals approximately +20° and the measured angle of arrival is 22.5° for a net AOA of 2.5°. If the good region requires a significant rotation angle α, the calibration tables for the strongest antenna and the other adjacent antenna is checked to see if the good region for that antenna pair requires less rotation in the other direction. The angle of rotation, α, has been observed in some embodiments to be 40° degrees, however, it is possible to have larger angles of rotation with a 6 antenna array.

If time permits or if higher AOA accuracy is desired, the stage can be used to step across the angles in the good region taking multiple AOA measurements. The AOA measurements can be processed to remove outliers. This removal can be as simple as removing the high and low measurements or removing those measurements more outside ±2 to 3 sigma from the mean value of the AOA measurements. The AOA measurements can be processed to weight the remaining measurements with the signal's signal-to-noise ratio (SNR) and compute the weighted mean of the remaining AOAs.

Figure 17:
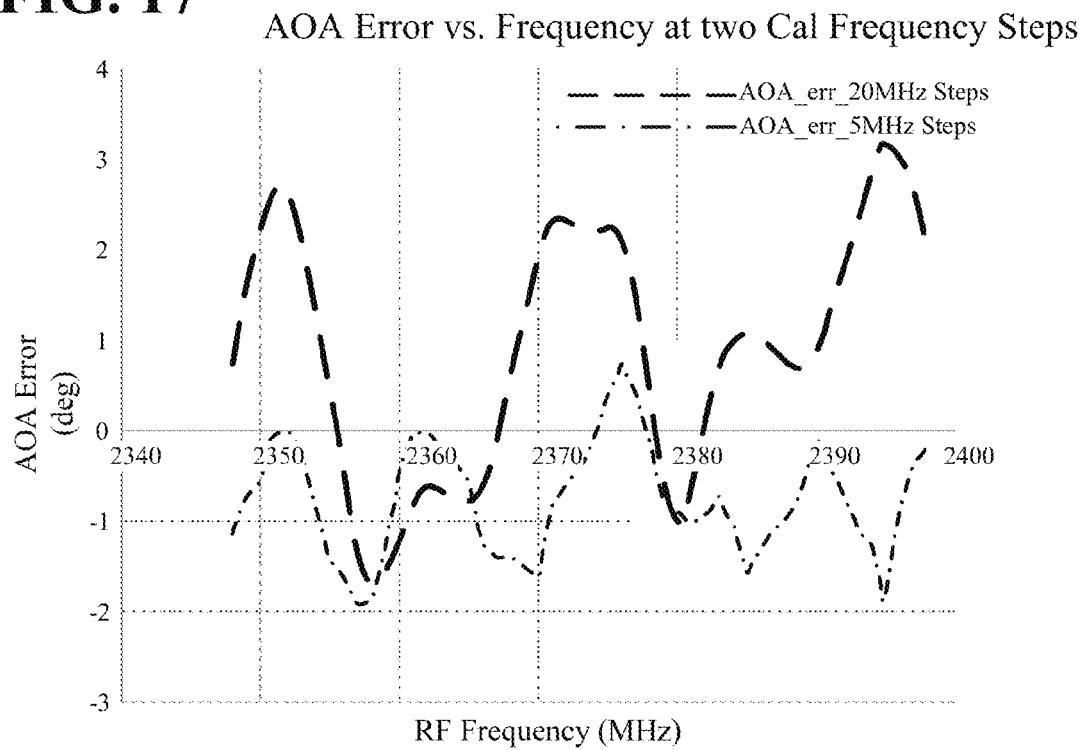
FIG. 17 depicts a plot of the AOA Error vs. Frequency for Calibration Frequency Steps of 5 MHz and 20 MHz at 2420 MHz.

In FIG. 17, a plot of the AOA Error versus Frequency is shown for calibration frequency steps of 5 MHz and of 20 MHz over the frequency range from 2340 MHz to 2400 MHz. It is apparent from FIG. 17 that the error when using 20 MHz calibration frequency steps is less than about 5° and the error when using 5 MHz calibration frequency steps is less than about 2.5°. These errors are substantially less than errors that exist when no rotation occurs. Non-rotation operation has errors which typically are +/−15° to 20°. The data for FIG. 12 were taken at one angle in the good region. Using multiple angles in the good region reduced the AOA error significantly.

The present invention is implemented with further and other embodiments. For example, the algorithms for implementing the antenna rotation include the following embodiments. The signal power is measured in many ways including (i) filtering the signal to the signal bandwidth and measuring the power with a power meter; this operation can be done in analog on the IF signal and reading the resultant power value from a power meter or digitally on the digitized samples, (ii) filtering the signal with a digital tuner and determining the power as the average of $(I^2+Q^2)$ from the complex tuner output samples and (iii), calculating an FFT on the signal and summing the power in all bins in the signal bandwidth as shown in FIG. 4.

If multiple signals are present in the processed bandwidth, AOA errors can occur if the two signals have similar AOAs. If they are separated significantly in azimuth angle (>120°) and have similar power levels (within 6 dB), the system can measure the AOA on both signals, however, the AOA's will have somewhat larger errors than with only one signal present. The use of filtering such as a FFT greatly reduces or eliminates the impact of multiple signals at different frequencies. If there are multiple target signals at the same frequency with similar power levels from the same general direction, the system is more likely to produce an incorrect AOA. If the multiple target signals come from significantly different directions, the system is more likely to produce proper results for the strongest signal.

As still further embodiments, various algorithms are used to interpolate the calibration table. For example, linear interpolation is used for each angle between calibration table values at frequencies on either side of the signal frequency. Still further, a spline fit is determined across more frequencies. Interpolation is done using linear power (Watts) or log power (dBm).

If the antennas are well behaved with a minimum amount of ripple, the antenna patterns are fit to polynomials. The use of polynomials calibration table storage space and allows the angle of arrival to be calculated instead of interpolated from the table.

The DF operation is performed with the assistance of computer program operations. A typical computer program for that purpose is listed hereinafter as Appendix 1. The computer program of Appendix 1 includes the subroutines listed in the following TABLE 2:

TABLE 2

| | Subroutine Name | Call Subroutine Line | Start Subroutine Line |
|---|---|---|---|
| 1 | DFcode.m | | 1 |
| 2 | readCal.m | 2 | 43 |
| 3 | calcPower.m | 4 | 93 |
| 4 | getAntennas.m | 6 | 129 |
| 5 | findGoodCalAngles.m | 9 | 144 |
| 6 | readdPwr.m | 26 | 253 |
| 7 | calcAOAfit.m | 31 | 261 |
| 8 | processAOA.m | 35 | 267 |
| 9 | getAvgFFT.m | 112 | 274 |

In TABLE 2, the 1st routine DFcode.m executes to perform the DF method with a six element antenna array on rotatable table 6 as shown in FIG. 1, FIG. 2 and FIG. 8. The execution operates to measure the Angle Of Arrival (AOA) of a signal which in the example described is at a frequency, freq=2420 MHz, over interpolated angles for calibration data from 0° to 360°. The antenna calibration data is read from the directory "folderCal" and is interpolated to return the 6×N table at frequency "freq". N is the number of angles in the calibration table, typically 180 (2 deg increment). The angle data is processed with a spline fit to return the power values at the angles in array "ang".

The 1st routine DFcode.m calls the subroutines listed in TABLE 2. The subroutines are readCal.m, calcPower.m, getAntennas.m, findGoodCalAngles.m, readdPwr.m, calcAOAfit.m, processAOA.m and getAvgFFT.m. These subroutines are first called at the lines in Appendix 1 listed in the Call Subroutine Line column in TABLE 2. The subroutines begin at the lines in Appendix 1 indicated in the Start Subroutine Line column of TABLE 2.

The 2nd subroutine "readCal.m" called at line 2 of APPENDIX 1 starts at line 43 of Appendix 1. The 2nd subroutine inputs are: folder: directory with the calibration data files where the file contains only cal files and the header file; freq: signal frequency to return cal data for the six antennas (MHz); ang: angles to return cal data (deg). The 2nd subroutine output is: pCal(antenna,power). The 2nd subroutine code executes pCal=readCal(folderCal, freq, ang) to store the calibration table for frequency "freq" and "ang" angles.

The subroutine "readADCsamples" is another read subroutine and operates analogously to the "readCal.m" subroutine and for conciseness is not shown in the code of Annex 1. The receiver is tuned to "freq" MHz and bandwidth is set by the digital tuner. The decimation factor and read "nSam" sample values are input to "fileOut" on disk. The "fs" value is the sample rate used by the ADC. The "readADCsamples" subroutine call sets up the configuration (freq, decimation, nSam) for future readADC commands.

The 3rd subroutine calcPower.m, called at line 4 of APPENDIX 1, starts at line 93 of Appendix 1. The ADC samples are read from a disk file where the inputs are: file: file name with the samples from the A/D converter; fs: Sample rate used by the A/D converter (Msam/sec); freq: Frequency of the signal of interest. The output is: pwr_dBm: signal power (dBm). The power for each of the six antennas is calculated and returns the six results in "pwr_dBm" where pwr_dBm=calcPower([folder fileOut], fs, freq). The 3rd subroutine calcPower.m calls at line 113 of Appendix 1 the 9th subroutine getAvgFFT.m at line 274 of Appendix 1 where [freq, pwr] =getAvgFFT(y, fs, nFFT) computes and plots the Hanning windowed FFT of data in vector y. The inputs are x: vector with input time samples; fs: sample rate of data (MHz); nFFT: FFT size to use. The outputs are f: frequency values for each bin (MHz); and pwr: power values for each bin (mWatts).

The 4th subroutine getAntennas.m, called at line 6 of APPENDIX 1, starts at line 130 of Appendix 1 and operates to find the two adjacent antennas with the highest power. The 4th subroutine determines the strongest antenna number and then the strongest adjacent antenna. The inputs, pwr, are the power values from each of the antennas (dBm). The outputs are ant1: Antenna number with the highest power and ant2: Antenna number with 2nd highest power adjacent to ant1.

After finding the ant1 and ant2 in the 4th subroutine, the ΔPower calibration differences for ant1 and ant2 are formed in line 7 of Appendix 1 (dpCal curve), dpCal=pCal(ant1,:)−pCal(ant2,:) and the ΔPower measured signals for ant1 and ant2 are formed in line 8 of Appendix 1 (dPwr curve), dPwr=pwr_dBm(ant1)−pwr_dBm(ant2).

The 5th subroutine findGoodCalAngles.m, called at line 9 of APPENDIX 1, starts at line 145 of Appendix 1 and operates to find the good angles in the dpCal curve. The Outputs are aScan, first and last angles to scan as the good region (deg); dpScan, delta Power Cal corresponding to the ends of the good regions (dB); kScan, the index of the ang or dp data with the ends of the good regions; aBest, best angle to use for a single measurement (deg); dPbest, the best delta Power Cal for a single measurement (dB).

In lines 11 through 25 of APPENDIX 1, the antennas are rotated clockwise at line 11 or counterclockwise at line 16 by a rotation angle.

The 6th subroutine readdPwr.m, called at line 26 of APPENDIX 1, starts at line 253 of Appendix 1 and operates to read the power levels for ant1 and ant2 and form the dPwr difference between the two. The computer system commands the receiver and A/D converter to collect data, read that data from disk and calculate the dPwr. The A/D converter is read using configuration file established earlier with the line 3 of APPENDIX 1 call to "readADCsamples". This config file, "fileDatCmd" sets the signal frequency, decimation factor (bandwidth), number of samples to read and which antennas to read. The digitized samples are stored "file" signal file family. The readADCsamples command appends the antenna number and suffix ".dat" on each output file name.

The 7th subroutine calcAOAfit.m, called at line 31 of APPENDIX 1, starts at line 261 of Appendix 1 and operates to calculate the AOA from the dPwr value and dpCal curve. The inputs are dPwr: delta power value from the two antennas (dB), kScan: start and stop array index of good region in dpCal array; dpCal: delta power cal array (dB); ang: angles of each element of dpCal (deg). The output is aoa: best AOA value (deg). The operation finds the array index "kAOA" of the dpCal data closest to the measured delta power "dPwr".

The 8th subroutine processAOA.m, called at line 35 of APPENDIX 1, starts at line 267 of Appendix 1 and operates to process the AOA arrays into the AOA histogram and find the best AOA value. The inputs are the aoas: array of the measured AOA's and the outputs is aoa: best AOA value.

Other embodiments not explicitly included in APPENDIX 1 are possible. In one embodiment, the power of ant2 is included with each element in aoas. The values where the power is significantly off from the max are discarded. The center of mass of the AOA values weighted with the power are returned. In another embodiment, the slope of the dpCal where the AOA was calculated is included. The AOA values are weighted by the slope.

While the invention has been particularly shown and described with reference to preferred embodiments thereof it will be understood by those skilled in the art that various changes in form and details may be made therein without departing from the scope of the invention.

```
1                    %       APPENDIX 1. (DFcode.m)
2   pCal = readCal(folderCal, freq, ang);      % get cal table at freq for ang angles
3   fs = readADCsamples(folder, fileCmd, fileOut, freq, decimation, nSam);
4   pwr_dBm = calcPower([folder fileOut], fs, freq);
5                    % find the two adjacent antenna numbers with the highest power
6   [ant1, ant2] = getAntennas(pwr_dBm);
7   dpCal = pCal(ant1,:) - pCal(ant2,:);       % delta power cal table (dBm)
8   dPwr = pwr_dBm(ant1) - pwr_dBm(ant2);  % measured delta power (dB)
9   [aScan, dpScan, kScan, aBest, dPbest] = findGoodCalAngles(ang,dpCal,ant1,ant2);
10                   % find the good region of the cal curve
11  if dPwr > dPbest                           % Rotate CW by increasing angle
12      angleEnd = aScan(1);
13      angle1 = aScan(2);
14      kdP1 = 1;
15      kdP2 = 2;
16  else                                       % Rotate CCW by decreasing angle
17      angle1 = aScan(1);
18      angleEnd = aScan(2);
19      angleStep = -angleStep;
20      kdP1 = 2;
21      kdP2 = 1;
22  end                                        % CW /CCW
23  for angle = angle1:angStep:angleEnd;       % step angle across good region
24      statusStage = setRotAngle(angle, stepsPerDeg);  % rotate to next angle step
25                   % read delta power from ADC's between antennas ant1 & ant2
26      dPwr = readdPwr([folder fileCmd], fileDatCmd, nAntennas, fs, freq, ant1, ant2);
27      if dPwr < dpScan(kdP2) && dPwr > dpScan(kdP1)   % angle is in Good Region
28          nAOA = nAOA + 1;                   % increment count of number of AOA's measured
29                   % calculate the AOA from the dPwr value and cal curve
```

```
30                          % Subtract off the rotary stage angle "angle"
31        aoas(nAOA) = calcAOAfit(dPwr,kScan,dpCal,ang) - angle;
32      end
33      if dPwr < dpScan(kdP1), break, end      % rotation past Good Region, stop angle
34    end
35    aoa = processAOAs(aoas(1:nAOA));   % process measured AOA's to find the best result
36    if angle == angleEnd                % failed to find angle, inform operator
37      disp(['** Did not find the right angle.'])
38      aoa = 0;
39    end                                 % inform the operator of the AOA result.
40    disp([num2str (freq) ', ' num2str (trial) ' AOA = ' num2str (aoa) ' deg'])
41    statusStage = setRotAngle(0, stepsPerDeg);   % Reset stage angle for next measurement
42    fclose('all');
43    function [pCal,d] = readCal(folder, freq, ang)
44    aOff = -180;
45    logInt = 1;
46    dr = pwd;                           % store current directory
47    cd(folder);                         % change directory to that holding cal files
48    d = dir;                            % read file names in to structure 'd'
49    cd(dr);                             % change back to original directory
50    nFreq = length(d)-2;                % number of frequency files in directory
51    f = zeros(2,nFreq);                 % array to hold the cal frequencies
52    for k = 1:nFreq
53      c = d (k+2).name;                 % name of k'th file
54      if strcmp(c(1:9),'calHeader') == 0   % ignore the header file in the directory
55        n1 = strfind(c,'_');            % frequency is to be preceeded by first '_'
56        n2 = strfind(c,'MHz');          % frequency is to be followed by 'MHz'
57        f(2,k) = str2double(c(n1(1)+1:n2-1));   % frequency value
58        f(1,k) = k;                     % frequency number
```

```
59      end
60    end
61    [fSort,kSort] = sort(f,2);                        % sort the frequency values
62    for k = 1:nFreq    % find the two frequencies above and below the frequency of interest
63       if fSort(2,k) >= freq, break, end              % gone past signal freq, stop.
64      end
65    k1 = kSort(2,k-1);                                % index of cal freq below signal freq
66    k2 = kSort(2,k);                                  % index of cal freq above signal freq
67    f1 = fSort(2,k-1);                                % cal frequency below signal freq
68    f2 = fSort(2,k);                                  % cal frequency above signal freq
69    x1 = textread([folder d (k1+2).name],'','delimiter',',').';    % read cal table below freq
70    x2 = textread([folder d (k2+2).name],'','delimiter',',').';    % read cal table above freq
71    [nAntennas, nAngles] = size(x1);
72    nAntennas = nAntennas - 1;
73    ang1 = x1(1,:);                                   % Angle information is the first column
74    ang2 = x2(1,:);                                   % Angle information is the first column
75    pCal = zeros(nAntennas,length(ang));              % initalize output cal array
76    m = (freq-f1) / (f2-f1);                          % linear frequency interpolation slope factor
77    nOff = 10;         % angle steps to extend array for proper interpolation at ends
78    for a = 1:nAntennas
79               % Extend the angle and power arrays by wrapping beyond -180 to 180 deg
80               % to allow proper interpolation at the ends.
81       ae = [ang1(end-nOff+1:end)-360 ang1 ang1(1:nOff)+360];   % extend angle array freq 1
82       xe = [x1(a+1,end-nOff+1:end) x1(a+1,:) x1(a+1,1:nOff)];   % extend power values freq 1
83       p1 = spline(ae,xe,ang);    % cal values at angles in 'ang' for lower freq with spline fit
84       ae = [ang2(end-nOff+1:end)-360 ang2 ang2(1:nOff)+360];        % angles for freq 2
85       xe = [x2(a+1,end-nOff+1:end) x2(a+1,:) x2(a+1,1:nOff)];       % powers for freq 2
86       p2 = spline(ae,xe,ang);          % cal values at angles in 'ang' for lower freq
87       if logInt == 1                   % interpolate in log (dB) or linear (mWatts)?
```

```
88        pCal(a,:) = p1*(1-m) + p2*m;   % interpolate between two freqs for given frequency
89      else
90        pCal(a,:) = 10*log10(10.^(p1/10)*(1-m) + 10.^(p2/10)*m);    % interpolate in mWatts
91      end
92   end
93   function pwr_dBm = calcPower(file, fs, freq)
94   useFFT = 1;
95   nIgnore = 100;       % Number of samples to ignore in file, must be even number
96   fDat = fopen(file ,'r','ieee-le');     % open data file with samples
97   x = fread (fDat, 'int16').';           % read data from the file
98   fclose(fDat);                          % close the file handle
99   delete(file);                          % delete the data file
100  xc = x(nIgnore+1:2:end) + i*x(nIgnore+2:2:end);  % convert to complex array
101  xc = xc - mean(xc);                    % remove the DC component of the signal
102  if useFFT == 0     % this assumes the signal has been filtered so the only signal present
103                     % in the data file is the signal of interest
104      pwr = mean(real (xc).^2 + imag (xc).^2);
105    pwr_dBm = 10*log10(pwr) - gain;
106  else
107              % FFT isolates the signal of interest in the midst of possible other signals.
108      nFFT = 1024;    % FFT size to calculate
109    nScan = 10;              % bins to scan to find strongest bin
110              % compute the average FFT with all of the samples in array "xc"
111              % return "f" frequency array (MHz) and "p" power array (mWatts).
112      [f, p] = getAvgFFT(xc, nFFT, fs);
113    [dum,kf] = min(abs(f-freq));        % find the fft bin closest to the signal frequency
114                                        % find bin with highest signal power
115    [dum,kfine] = max(p(kf-nScan:kf+nScan));     % relative bin number
116    kf = kf - nScan + kfine - 1;                 % absolute bin number
```

```
117    pMax = max(p);                         % max bin power
118    thr = 0.05*pMax;    % threshold bin power considered to contain signal power
119    for k = kf:-1:kf-100                   % scan below strongest bin
120       if p(k) < thr, break, end           % power less than threshold, stop
121    end
122    k1 = k;                                % store the lowest bin number to sum
123    for k = kf:1:kf+100                    % scan above strongest bin
124       if p(k) < thr, break, end           % power less than threshold, stop
125    end
126    pwr = sum(p(k1:k));                    % sum the power above the threshold (mWatts)
127    pwr_dBm = 10*log10(pwr);               % convert to dBm
128 end
129 function [ant1, ant2] = getAntennas(pwr)
130 nAntennas = length(pwr);                  % number of antennas in the array
131 [pMax, ant1] = max(pwr);                  % find antenna with strongest power
132                                           % deal with antennas wrapping.  Antennas 1 & 6 are adjacent
133 switch ant1
134    case 1
135       ant2 = nAntennas;
136       if pwr(2) > pwr(nAntennas), ant2 = 2; end
137    case nAntennas
138       ant2 = 1;
139       if pwr(nAntennas-1) > pwr(1), ant2 = nAntennas-1; end
140    otherwise
141       ant2 = ant1 + 1;
142       if pwr(ant1-1) > pwr(ant2), ant2 = ant1-1; end
143 end
144 function [aScan, dpScan, kScan, aBest, dPbest] = findGoodCalAngles(ang,dp,ant1,ant2)
145 slopeThr = -0.1;                          % don't use regions with shallow slope (dB/deg)
```

```
146    slopeThr = slopeThr * (ang(11)-ang(10));    % slope (dB/step)
147    ae(1) = ant1;
148    ae(2) = ant2;
149    if (ant1 == 1 && ant2 == 6)
150       ae(2) = ant1;
151       ae(1) = ant2;
152       dp = -dp;                                 % reverse slope
153    else
154       if ant2 < ant1 && ant1 ~= 6
155          ae(2) = ant1;
156          ae(1) = ant2;
157          dp = -dp;                              % reverse slope
158       end
159    end
160    angleFudge = 5;            % amount to scan beyond the ideal 60 deg (+/- degrees)
161    a1 = ae(1)*60 + angleFudge;                  % first angle to search for good region
162    if ae(1) == 6, a1 = angleFudge; end
163    a2 = a1 - 60 - 2*angleFudge;                 % last angle to search for good region
164    if a1 > 180, a1 = a1 - 360; end              % a1 - 360; end
165    if a2 > 180, a2 = a2 - 360; end
166    if ae(1) == 3 && ae(2) == 4, a1 = 178; end
167    if ae(1) == 4 && ae(2) == 5, a2 = -180; end
168    ddp = diff(dp);           % derivative of delta power curve.  Should be <0 for good region
169    [amin, k1] = min(abs(ang-a1));               % start index to search
170    [amin, k2] = min(abs(ang-a2));               % last index to search
171    if k1 == 361, k1 = 360; end
172    if k2 > k1, k2 = k1-70; end
173    if k2 < 1, k2 = 1; end
174                   % Find the regions with the longest monotonic dPwr curve
```

```
175    region = 0;                  % initialize the number of good regions found
176    goodFlag = 0;
177    kAng = zeros(20,2);          % initalize angle indices in good regions
178    for k = k1:-1:k2
179       if ddp(k) < slopeThr && goodFlag == 0
180          goodFlag = 1;
181          region = region + 1;
182          kAng(region,1) = k;
183       end
184       if ddp(k) > slopeThr && goodFlag == 1
185          goodFlag = 0;
186          kAng(region,2) = k+1;
187       end
188    end
189    if kAng(region,2) == 0, kAng(region,2) = k2+1; end
190    kAngSave = kAng;
191    rOut = 0;
192    for r = 1:region             % eliminate short good regions
193       if kAng(r,1)-kAng(r,2) > 3    % good region longer than 3 steps?
194          rOut = rOut + 1;
195          kAngSave(rOut,:) = kAng(r,:);
196       end
197    end
198    if rOut == 0;
199       kAngSave(1,:) = kAng(1,:);
200       rOut = 1;
201    end
202    region = rOut;
203    kAng = kAngSave;
```

```
204                                         %  Reduce by the ambiguities
205    for r = 1:region
206       dpMax = max(dp(kAng(r,1):k1));        % find highest point outside the good region
207       [p1,kp1] = min(abs(dp(kAng(r,2):kAng(r,1))-dpMax));   % find the index of
208                                             %the same level inside
209       kp1 = kp1 + kAng(r,2) - 1;
210       dpMax = min(dp(k2:kAng(r,2)));        % find highest point outside the good region
211       [p2,kp2] = min(abs(dp(kAng(r,2):kAng(r,1))-dpMax));   % find index same level inside
212       kp2 = kp2 + kAng(r,2) - 1;
213       if kp1 < kAng(r,1)
214          kAng(r,1) = kp1-1;
215       else
216          kAng(r,1) = kp1;
217       end
218       if kp2 > kAng(r,2)
219          kAng(r,2) = kp2+1;
220       else
221          kAng(r,2) = kp2;
222       end
223    end
224    if region == 0                          %  Find the longest usable region
225       aScan(1) = -999;
226       aScan(2) = aScan(1);
227       dpScan = aScan;
228       kScan = aScan;
229    else
230       maxRange = 0;
231       for r = 1:region
232          range = kAng(r,1)-kAng(r,2);
```

| | | |
|---|---|---|
| 233 | if range > maxRange; | |
| 234 | maxRange = range; | |
| 235 | rMax = r; | |
| 236 | end | |
| 237 | end | |
| 238 | kScan(1) = kAng(rMax,1); | |
| 239 | kScan(2) = kAng(rMax,2); | |
| 240 | dk = kScan(1)-kScan(2); | |
| 241 | kOff = round(0.2*dk); | |
| 242 | if k1-kScan(1) > 1, kScan(1) = kScan(1)-kOff; end | % get away from bad region |
| 243 | if kScan(2)-k2 > 1, kScan(2) = kScan(2)+kOff; end | % get away from bad region |
| 244 | if kScan(2) > kScan(1), kScan(2)= kScan(1)-1; end | |
| 245 | aScan(1) = ang(kScan(1)); | |
| 246 | aScan(2) = ang(kScan(2)); | |
| 247 | dpScan(1) = dp(kScan(1)); | |
| 248 | dpScan(2) = dp(kScan(2)); | |
| 249 | end | |
| 250 | kMean = round((kScan(1) + kScan(2))/2); | |
| 251 | aBest = ang(kMean); | |
| 252 | dPbest = dp(kMean); | |
| 253 | function dPwr = readdPwr(file, fileDatCmd, nAntennas, fs, freq, ant1, ant2) | |
| 254 | status = readADC(fileDatCmd, file); | |
| 255 | if status == 1, return, end | |
| 256 | pwr_dBm = zeros(1,nAntennas); | |
| 257 | for antenna = 1:nAntennas | % claculate the power from the 6 antennas |
| 258 | pwr_dBm = calcPower([file num2str (antenna) '.dat'], fs, freq); | |
| 259 | end | % antenna |
| 260 | dPwr = pwr_dBm(ant1) - pwr_dBm(ant2); | % delta power (dB) |
| 261 | function aoa = calcAOAfit(dPwr,kScan,dpCal,ang) | |

```
262     [pMin, kAOA] = min(abs(dpCal(kScan(2):kScan(1))-dPwr));
263     k1 = floor(kAOA) + kScan(2) - 1;   % index below the closest fit
264     k2 = k1 + 1;                       % index above the closest fit linearly interpolate the cal
265                                        % data to find the angle corresponding to the dPwr value.
266     aoa = ang(k1) + (dpCal(k1)-dPwr) * (ang(k2)-ang(k1))/(dpCal(k1)-dpCal(k2));
267     function aoa = processAOA(aoas)
268     nAOAs = length(aoas);              % number of AOA values
269     aoaSort = sort(aoas);              % sort the AOA values
270     if nAOAs > 5                       % enough to throw out high & low as possible outliers
271         aoaSort = aoaSort(2:end-1);
272     end
273     aoa = mean(aoaSort);               % return the average AOA value
274     function [f, pwr] = getAvgFFT(y, nFFT, fs)
275     w = blackman (nFFT).';             % use Blackman-Harris window function
276     nAvg = floor(length (y)/nFFT);     % number of FFT's possible with data array
277     nPlot = floor(nFFT/2);             % number of unique bins
278     pwr = zeros(1,nFFT);               % initialize average power array
279     start = 1;                         % initialize sample to start computing FFT's
280     for k = 1:nAvg                     % sum the power in each bin of windowed FFT's
281         pwr = pwr + (abs (fft(w.*x(start:start+nFFT-1))).^2);
282         start = start + nFFT;          % update start bin for next FFT
283     end
284     pwr = pwr / nAvg;                  % Convert total power to average power
285     dF = 1/(length (pwr)/fs);          % bin width (MHz)
286     if isreal(y) == 0,                 % complex data
287         n = length(pwr);
288         sv = pwr;
289         clear pwr;
290         pwr(nPlot+1:2*nPlot) = sv(1:nPlot);
```

```
291       pwr(1:nPlot) = sv(n-nPlot+1:n);    % set bin order to return
292       clear sv;
293       f = -dF*nPlot:dF:dF*(nPlot-1);     % output frequency array
294    else
295       f = 0:dF:dF*(nPlot - 1);           % output frequency array
296       pwr = pwr(1:nPlot);                % only return unique bins
297    end
```

The invention claimed is:

1. A direction finding system for finding the angle of arrival AOA of a target signal from a transmitter comprising,
    an antenna array unit including a plurality of directional antennas positioned to face different directions for receiving the target signal,
    a rotatable mount for supporting and rotating the antenna array unit,
    a receiver unit connected to the directional antennas for providing digital values representing the target signal, and
    a computer for,
        storing calibration information for the directional antennas,
        processing the digital values and the calibration information to determine a rotation angle α for rotating the antenna array,
        commanding the rotatable mount to rotate by the rotation angle α to cause the receiver unit to provide new digital values,
        processing the new digital values and the calibration information to determine an intersection angle, and
        subtracting the rotation angle from the intersection angle to determine a final value for the angle of arrival of the target signal.

2. The direction finding system of claim 1 wherein the calibration information is calibrated power difference, ΔPowerCal, values determined for a pair of adjacent antennas and the digital values and the new digital values are processed to form power difference, ΔPower, values for the pair of adjacent antennas.

3. The direction finding system of claim 2 wherein the rotatable mount, when rotated by the rotation angle α, rotates the antenna array unit to a region where the ΔPowerCal values are free of ambiguities.

4. The direction finding system of claim 3 wherein the rotatable mount, when rotated by the rotation angle α rotates the antenna array unit to an angle where the ΔPowerCal values exhibit a long, steep and smooth slope.

5. The direction finding system of claim 1 wherein the receiver unit includes one or more receivers that connect to the directional antennas through a switch and where the switch connects different ones of the directional antennas to the one or more receivers at different times whereby the one or more receivers process the outputs from the connected ones of the directional antennas.

6. The direction finding system of claim 1 wherein the antenna array unit includes N antennas and wherein the computer executes a find antennas, getAntennas, routine to process digital values for the N antennas to determine a first antenna as having the highest power signal and to determine a second antenna, adjacent the first antenna, having the next highest power signal.

7. The direction finding system of claim 6 wherein the calibration information for the first antenna and the second antenna is retrieved by the computer and processed to form calibrated power difference, ΔPowerCal, values and wherein the computer executes a find good angles, findGoodCalAngles, routine to find a good region of ΔPowerCal values free of ambiguities.

8. The direction finding system of claim 1 wherein the antenna array unit includes six antennas arrayed at 60° intervals to cover a 360° angular range for receiving the target signal.

9. The direction finding system of claim 1 wherein the system further includes, a receiver in the receiver unit for receiving radio frequency, RF, signals from the directional antennas to provide intermediate frequency, IF, signals in response to receiving the target signal, and wherein the system further includes in the receiver unit a converter for providing digital signals from the IF signals and wherein the computer calculates power difference, ΔPower, values from the digital signals.

10. The direction finding system of claim 1 wherein,
    the receiver unit includes,
        a receiver for receiving radio frequency, RF, signals including the target signal from the directional antennas and providing intermediate frequency, IF, signals in response to receiving the target signal at the antenna array unit,
        an analog-to-digital, A/D, converter for digitizing the IF signals to form received digital A/D values as a digital-time-waveform representation of the IF signals and the target signal,
    the computer includes and executes the following routines:
        multiplying the A/D values by a window function for selection of a window of A/D values as real A/D values,
        processing the real A/D values with a fast Fourier transform, FFT, to form complex values having real parts I and imaginary parts Q in FFT bins,
        summing the real parts I and imaginary parts Q to form $10*\log_{10}\{\Sigma(I^2+Q^2)\}$ signal power values over the FFT bins,
        calculating ΔPower values as the difference of the signal power values for the receiver unit digital values and the receiver unit new digital values.

11. The direction finding system of claim 1 wherein,
    the antenna array unit includes a switch connected for selecting radio frequency, RF, outputs from two or more of the plurality of directional antennas,
    the receiver unit includes one or more receivers for receiving the RF outputs from the switch.

12. The direction finding system of claim 11 wherein the antenna array unit includes six antennas, the receiver unit includes one receiver and the switch operates to connect the six antennas one at a time to the receiver.

13. A direction finding system for finding the angle of arrival of a target signal comprising,
    an antenna array unit including a plurality of directional antennas positioned to face different angular directions for receiving the target signal over a 360° angular range,
    a rotatable mount for supporting and rotating the antenna array unit,
    a receiver unit including,
        a receiver for receiving radio frequency, RF, signals including the target signal from the directional antennas and providing intermediate frequency, IF, signals in response to receiving the target signal at the antenna array unit,
        an analog-to-digital, A/D, converter for digitizing the IF signals to form received digital values as a digital-time-waveform representation of the IF signals and the target signal, and
    a computer for,
        storing calibration information for the directional antennas as a function of angular direction and providing calibrated power difference, ΔPowerCal, values for a pair of the antennas,
        calculating a power difference, ΔPower, value from the received digital values for the pair of antennas for the target signal,
        comparing the ΔPower value with the ΔPowerCal values to determine a rotation angle for rotating the antenna array unit,
        commanding the rotatable mount to rotate by the rotation angle to cause the receiver unit to provide new received digital values, calculating a new ΔPower value from the new digital values,
interpolating the ΔPowerCal values to determine the intersection angle where the new ΔPower value intersects the ΔPowerCal values, and
subtracting the rotation angle from the intersection angle to determine a final value for the angle of arrival of the target signal.

* * * * *